United States Patent
Park

(10) Patent No.: US 7,911,905 B2
(45) Date of Patent: *Mar. 22, 2011

(54) WRITE-ONCE OPTICAL DISC, AND METHOD AND APPARATUS FOR RECORDING/REPRODUCING MANAGEMENT INFORMATION ON/FROM OPTICAL DISC

(75) Inventor: Yong Cheol Park, Gwachon-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/506,210

(22) Filed: Jul. 20, 2009

(65) Prior Publication Data

US 2010/0020652 A1    Jan. 28, 2010

Related U.S. Application Data

(63) Continuation of application No. 11/984,034, filed on Nov. 13, 2007, now Pat. No. 7,570,559, which is a continuation of application No. 10/911,728, filed on Aug. 5, 2004, now Pat. No. 7,317,670.

(30) Foreign Application Priority Data

| Aug. 5, 2003 | (KR) | ......................... | 10-2003-0054165 |
| Oct. 20, 2003 | (KR) | ......................... | 10-2003-0073088 |
| Feb. 5, 2004 | (KR) | ......................... | 10-2004-0007608 |

(51) Int. Cl.
  *G11B 7/00* (2006.01)

(52) U.S. Cl. .................................... 369/53.17

(58) Field of Classification Search ............... 369/53.12, 369/53.13, 53.14, 53.15, 53.17, 275.3, 47.27, 369/53.1

See application file for complete search history.

(56) References Cited

U.S. PATENT DOCUMENTS

| 4,558,446 A | 12/1985 | Banba et al. |
| 4,733,386 A | 3/1988 | Shimoi |
| 4,807,205 A | 2/1989 | Picard et al. |
| 4,963,866 A | 10/1990 | Duncan |
| 5,065,388 A | 11/1991 | Roth et al. |
| 5,068,842 A | 11/1991 | Naito et al. |
| 5,111,444 A | 5/1992 | Fukushima et al. |
| 5,210,734 A | 5/1993 | Sakurai et al. |
| 5,235,585 A | 8/1993 | Bish et al. |
| 5,237,553 A | 8/1993 | Fukushima et al. |
| 5,247,494 A | 9/1993 | Ohno et al. |
| 5,319,626 A | 6/1994 | Ozaki et al. |

(Continued)

FOREIGN PATENT DOCUMENTS

CN    1134017 A    10/1996

(Continued)

OTHER PUBLICATIONS

JIS handbook data processing for hardware, Japan, Japanese Standards Association Inc., Apr. 21, 1999, pp. 1064-1070.

(Continued)

*Primary Examiner* — Nabil Z Hindi
(74) *Attorney, Agent, or Firm* — Birch, Stewart, Kolasch & Birch, LLP

(57) ABSTRACT

A write-once optical disc and a method and apparatus for recording management information on the optical disc are provided. The optical disc includes at least one recording layer and a plurality of temporary defect management areas (TDMAs) on the at least one recording layer. At least one of the TDMAs includes an indicator indicating which one of the TDMAs has an in-use status.

25 Claims, 20 Drawing Sheets

- TLI : TDMA Location Indicator
- TDMA : Temporary Disc Management Area

U.S. PATENT DOCUMENTS

| | | |
|---|---|---|
| 5,404,357 A | 4/1995 | Ito et al. |
| 5,442,611 A | 8/1995 | Hosaka et al. |
| 5,448,728 A | 9/1995 | Takano et al. |
| 5,475,820 A | 12/1995 | Natrasevschi et al. |
| 5,481,519 A | 1/1996 | Hosoya et al. |
| 5,495,466 A | 2/1996 | Dohmeier et al. |
| 5,528,571 A | 6/1996 | Funahashi et al. |
| 5,553,045 A | 9/1996 | Obata et al. |
| 5,577,194 A | 11/1996 | Wells et al. |
| 5,608,715 A | 3/1997 | Yokogawa et al. |
| 5,715,221 A | 2/1998 | Ito et al. |
| 5,720,030 A | 2/1998 | Kamihara et al. |
| 5,740,435 A | 4/1998 | Yamamoto et al. |
| 5,745,444 A | 4/1998 | Ichikawa et al. |
| 5,799,212 A | 8/1998 | Ohmori et al. |
| 5,802,028 A | 9/1998 | Igarashi et al. |
| 5,805,536 A | 9/1998 | Gage et al. |
| 5,848,038 A | 12/1998 | Igarashi et al. |
| 5,867,455 A | 2/1999 | Miyamoto et al. |
| 5,878,020 A | 3/1999 | Takahashi et al. |
| 5,914,928 A | 6/1999 | Takahashi et al. |
| 5,940,702 A | 8/1999 | Sakao et al. |
| 6,058,085 A | 5/2000 | Obata et al. |
| 6,118,608 A | 9/2000 | Kakihara et al. |
| 6,138,203 A | 10/2000 | Inokuchi et al. |
| 6,160,778 A | 12/2000 | Ito et al. |
| 6,189,118 B1 | 2/2001 | Sasaki et al. |
| 6,233,654 B1 | 5/2001 | Aoki et al. |
| 6,246,829 B1 | 6/2001 | Nakagawa |
| 6,292,445 B1 | 9/2001 | Ito et al. |
| 6,341,109 B1 | 1/2002 | Kayanuma |
| 6,341,278 B1 | 1/2002 | Yamamoto et al. |
| 6,373,800 B1 | 4/2002 | Takahashi et al. |
| 6,405,332 B1 | 6/2002 | Bando et al. |
| 6,414,923 B1 | 7/2002 | Park et al. |
| 6,447,126 B1 | 9/2002 | Hornbeck |
| 6,466,532 B1 | 10/2002 | Ko et al. |
| 6,469,978 B1 | 10/2002 | Ohata et al. |
| 6,477,126 B1 | 11/2002 | Park et al. |
| 6,480,446 B1 | 11/2002 | Ko |
| 6,493,301 B1 | 12/2002 | Park |
| 6,496,807 B1 | 12/2002 | Inokuchi et al. |
| 6,529,458 B1 | 3/2003 | Shin |
| 6,542,450 B1 | 4/2003 | Park |
| 6,564,345 B1 | 5/2003 | Kim et al. |
| 6,581,167 B1 | 6/2003 | Gotoh et al. |
| 6,606,285 B1 | 8/2003 | Ijtsma et al. |
| 6,615,363 B1 | 9/2003 | Fukasawa |
| 6,631,106 B1 | 10/2003 | Numata et al. |
| 6,633,724 B1 | 10/2003 | Hasegawa et al. |
| 6,667,939 B1 | 12/2003 | Miyamoto |
| 6,671,249 B2 | 12/2003 | Horie |
| 6,697,306 B2 | 2/2004 | Sako |
| 6,714,502 B2 | 3/2004 | Ko et al. |
| 6,724,701 B2 | 4/2004 | Ijtsma et al. |
| 6,738,341 B2 | 5/2004 | Ohata et al. |
| 6,754,860 B2 | 6/2004 | Kim et al. |
| 6,760,288 B2 | 7/2004 | Ijtsma et al. |
| 6,763,429 B2 | 7/2004 | Hirayama |
| 6,766,418 B1 | 7/2004 | Alexander et al. |
| 6,785,206 B1 | 8/2004 | Lee et al. |
| 6,788,631 B1 | 9/2004 | Park et al. |
| 6,795,389 B1 | 9/2004 | Nishiuchi et al. |
| 6,804,797 B2 | 10/2004 | Ko et al. |
| 6,826,140 B2 | 11/2004 | Brommer et al. |
| 6,842,580 B1 | 1/2005 | Ueda et al. |
| 6,845,069 B2 | 1/2005 | Nakahara et al. |
| 6,883,111 B2 | 4/2005 | Yoshida et al. |
| 6,918,003 B2 | 7/2005 | Sasaki |
| 6,934,236 B2 | 8/2005 | Lee et al. |
| 6,999,398 B2 | 2/2006 | Yamamoto et al. |
| 7,002,882 B2 | 2/2006 | Takahashi |
| 7,027,059 B2 | 4/2006 | Hux et al. |
| 7,027,373 B2 | 4/2006 | Ueda et al. |
| 7,042,825 B2 | 5/2006 | Yamamoto et al. |
| 7,050,701 B1 | 5/2006 | Sasaki et al. |
| 7,092,334 B2 | 8/2006 | Choi et al. |
| 7,123,556 B2 | 10/2006 | Ueda et al. |
| 7,149,930 B2 | 12/2006 | Ogawa et al. |
| 7,161,879 B2 | 1/2007 | Hwang et al. |
| 7,184,377 B2 | 2/2007 | Ito et al. |
| 7,188,271 B2 | 3/2007 | Park et al. |
| 7,233,550 B2 | 6/2007 | Park et al. |
| 7,236,687 B2 | 6/2007 | Kato et al. |
| 7,272,086 B2 | 9/2007 | Hwang et al. |
| 7,289,404 B2 | 10/2007 | Park et al. |
| 7,296,178 B2 | 11/2007 | Yoshida et al. |
| 7,313,066 B2 | 12/2007 | Hwang et al. |
| 7,327,654 B2 | 2/2008 | Hwang et al. |
| 7,349,301 B2 | 3/2008 | Terada et al. |
| 7,355,934 B2 | 4/2008 | Park et al. |
| 7,379,402 B2 | 5/2008 | Ko et al. |
| 7,420,909 B2 | 9/2008 | Yoshida et al. |
| 7,428,670 B2 | 9/2008 | Hwang et al. |
| 7,483,349 B2 | 1/2009 | Park et al. |
| 2001/0009537 A1 | 7/2001 | Park |
| 2001/0011267 A1 | 8/2001 | Kihara et al. |
| 2001/0026511 A1 | 10/2001 | Ueda et al. |
| 2001/0043525 A1 | 11/2001 | Ito et al. |
| 2002/0025138 A1 | 2/2002 | Isobe et al. |
| 2002/0097665 A1 | 7/2002 | Ko et al. |
| 2002/0097666 A1 | 7/2002 | Ko et al. |
| 2002/0099950 A1 | 7/2002 | Smith |
| 2002/0136118 A1 | 9/2002 | Takahashi |
| 2002/0136134 A1 | 9/2002 | Ito et al. |
| 2002/0136537 A1 | 9/2002 | Takahashi |
| 2002/0159382 A1 | 10/2002 | Ohata et al. |
| 2002/0161774 A1 | 10/2002 | Tol et al. |
| 2002/0176341 A1 | 11/2002 | Ko et al. |
| 2003/0072236 A1 | 4/2003 | Hirotsune et al. |
| 2003/0095482 A1 | 5/2003 | Hung et al. |
| 2003/0126527 A1 | 7/2003 | Kim et al. |
| 2003/0135800 A1 | 7/2003 | Kim et al. |
| 2003/0137909 A1 | 7/2003 | Ito et al. |
| 2003/0137910 A1 | 7/2003 | Ueda et al. |
| 2003/0142608 A1 | 7/2003 | Yamamoto et al. |
| 2003/0149918 A1 | 8/2003 | Takaichi |
| 2003/0173669 A1 | 9/2003 | Shau |
| 2003/0198155 A1 | 10/2003 | Go et al. |
| 2004/0001408 A1 | 1/2004 | Propps et al. |
| 2004/0004917 A1 | 1/2004 | Lee |
| 2004/0062159 A1 | 4/2004 | Park et al. |
| 2004/0062160 A1 | 4/2004 | Park et al. |
| 2004/0076096 A1 | 4/2004 | Hwang et al. |
| 2004/0105363 A1 | 6/2004 | Ko et al. |
| 2004/0114474 A1 | 6/2004 | Park et al. |
| 2004/0120233 A1 | 6/2004 | Park et al. |
| 2004/0125716 A1 | 7/2004 | Ko et al. |
| 2004/0125717 A1 | 7/2004 | Ko et al. |
| 2004/0136292 A1 | 7/2004 | Park et al. |
| 2004/0145980 A1 | 7/2004 | Park et al. |
| 2004/0158768 A1 | 8/2004 | Park et al. |
| 2004/0174782 A1 | 9/2004 | Lee et al. |
| 2004/0174785 A1 | 9/2004 | Ueda et al. |
| 2004/0179445 A1 | 9/2004 | Park et al. |
| 2004/0179458 A1 | 9/2004 | Hwang et al. |
| 2004/0193946 A1 | 9/2004 | Park et al. |
| 2004/0223427 A1 | 11/2004 | Kim et al. |
| 2004/0246851 A1 | 12/2004 | Hwang et al. |
| 2005/0007910 A1 | 1/2005 | Ito et al. |
| 2005/0008346 A1 | 1/2005 | Noguchi et al. |
| 2005/0025007 A1 | 2/2005 | Park |
| 2005/0047294 A1 | 3/2005 | Park |
| 2005/0050402 A1 | 3/2005 | Koda et al. |
| 2005/0052972 A1 | 3/2005 | Park |
| 2005/0052973 A1 | 3/2005 | Park |
| 2005/0055500 A1 | 3/2005 | Park |
| 2005/0060489 A1 | 3/2005 | Park |
| 2005/0068877 A1 | 3/2005 | Yeo |
| 2005/0083740 A1 | 4/2005 | Kobayashi |
| 2005/0083767 A1 | 4/2005 | Terada et al. |
| 2005/0083830 A1 | 4/2005 | Martens et al. |
| 2005/0195716 A1 | 9/2005 | Ko et al. |
| 2005/0207262 A1 | 9/2005 | Terada et al. |
| 2005/0289389 A1 | 12/2005 | Yamagami et al. |
| 2006/0077827 A1 | 4/2006 | Takahashi |
| 2006/0195719 A1 | 8/2006 | Ueda et al. |

| | | | |
|---|---|---|---|
| 2006/0203635 A1 | 9/2006 | Ko et al. | |
| 2006/0203638 A1 | 9/2006 | Ko et al. | |
| 2006/0203684 A1 | 9/2006 | Ko et al. | |
| 2006/0227694 A1 | 10/2006 | Woerlee et al. | |
| 2006/0233078 A1 | 10/2006 | Terada et al. | |
| 2007/0294571 A1 | 12/2007 | Park et al. | |
| 2008/0046780 A1 | 2/2008 | Shibuya et al. | |

FOREIGN PATENT DOCUMENTS

| | | |
|---|---|---|
| CN | 1140897 C | 1/1997 |
| CN | 1227950 A | 9/1999 |
| CN | 1273419 A | 11/2000 |
| CN | 1140897 C | 3/2004 |
| CN | 1675708 A | 9/2005 |
| CN | 1685426 A | 10/2005 |
| DE | 199 54 054 A1 | 6/2000 |
| EP | 0314186 A2 | 5/1989 |
| EP | 0325823 A1 | 8/1989 |
| EP | 0350920 A2 | 1/1990 |
| EP | 0464811 A2 | 1/1992 |
| EP | 0472484 A2 | 2/1992 |
| EP | 0477503 A2 | 4/1992 |
| EP | 0 556 046 A1 | 8/1993 |
| EP | 0 871 172 A2 | 10/1998 |
| EP | 0 908 882 A2 | 4/1999 |
| EP | 0 974 967 A1 | 1/2000 |
| EP | 0 989 554 A1 | 3/2000 |
| EP | 0 997 904 A1 | 5/2000 |
| EP | 1 026 681 B1 | 8/2000 |
| EP | 1 043 723 A1 | 10/2000 |
| EP | 1 132 914 A2 | 9/2001 |
| EP | 1 148 493 A2 | 10/2001 |
| EP | 1 152 414 A2 | 11/2001 |
| EP | 1 239 478 A1 | 9/2002 |
| EP | 1 274 081 A2 | 1/2003 |
| EP | 1 298 659 A1 | 4/2003 |
| EP | 1 329 888 A1 | 7/2003 |
| EP | 1 347 452 A2 | 9/2003 |
| EP | 1652174 | 2/2005 |
| EP | 1652175 | 2/2005 |
| EP | 1 547 065 A1 | 6/2005 |
| EP | 1 564 740 A1 | 8/2005 |
| EP | 1 573 723 A1 | 9/2005 |
| EP | 1 609 135 A | 12/2005 |
| EP | 1 612 790 A1 | 1/2006 |
| EP | 1 623 422 | 2/2006 |
| EP | 1662505 A1 | 5/2006 |
| GB | 2 356 735 A | 5/2001 |
| JP | 63-091842 A | 4/1988 |
| JP | 64-46280 A | 2/1989 |
| JP | 01-263955 A1 | 10/1989 |
| JP | 02-023417 A | 1/1990 |
| JP | 05-274814 A | 10/1993 |
| JP | 06-349201 A | 12/1994 |
| JP | 07-029177 A | 1/1995 |
| JP | 08-096522 A | 4/1996 |
| JP | 09-145634 A | 6/1997 |
| JP | 09-23105 A | 9/1997 |
| JP | 10-050005 A1 | 2/1998 |
| JP | 10-050032 A | 2/1998 |
| JP | 10-187356 A1 | 7/1998 |
| JP | 10-187357 A1 | 7/1998 |
| JP | 10-187358 A1 | 7/1998 |
| JP | 10-187359 A1 | 7/1998 |
| JP | 10-187360 A1 | 7/1998 |
| JP | 10-187361 A1 | 7/1998 |
| JP | 10-289524 A | 10/1998 |
| JP | 11-11088 A1 | 4/1999 |
| JP | 11110888 A | 4/1999 |
| JP | 11-203792 A | 7/1999 |
| JP | 2000-090588 A1 | 3/2000 |
| JP | 2000-149449 A | 5/2000 |
| JP | 2000-195178 A | 7/2000 |
| JP | 2000-215612 | 8/2000 |
| JP | 2000-285607 A | 10/2000 |
| JP | 2001-023317 A | 1/2001 |
| JP | 2001-069440 A | 3/2001 |
| JP | 2001-110168 A | 4/2001 |
| JP | 2001-351334 A | 12/2001 |
| JP | 2001-357623 A | 12/2001 |
| JP | 2002-015507 A | 1/2002 |
| JP | 2002-015525 A | 1/2002 |
| JP | 2002-056619 A | 2/2002 |
| JP | 2002-215612 A | 8/2002 |
| JP | 2002-245723 A | 8/2002 |
| JP | 2002-288938 A | 10/2002 |
| JP | 2002-329321 A | 11/2002 |
| JP | 2002-352522 A | 12/2002 |
| JP | 2003-30844 A | 1/2003 |
| JP | 2003-536194 A | 12/2003 |
| JP | 2004-280864 A | 10/2004 |
| JP | 2004-280865 A | 10/2004 |
| JP | 2005-004912 A | 1/2005 |
| JP | 2005-56542 A | 3/2005 |
| JP | 2005-535993 A | 11/2005 |
| JP | 2005-538490 A | 12/2005 |
| JP | 2005-538491 A | 12/2005 |
| JP | 2006-519445 A | 8/2006 |
| JP | 2007-501488 T | 1/2007 |
| JP | 2008-112577 A | 5/2008 |
| KR | 10-2004-009430 A | 11/2004 |
| RU | 2223556 C2 | 10/2001 |
| RU | 2208844 C2 | 7/2003 |
| RU | 2005 103 626 | 9/2005 |
| RU | 2005 127 337 | 2/2006 |
| TW | 371752 A | 10/1999 |
| TW | 413805 | 12/2000 |
| WO | WO-84/00628 A1 | 2/1984 |
| WO | WO-96/30902 A1 | 10/1996 |
| WO | WO-97/22182 A1 | 6/1997 |
| WO | WO-00/54274 A1 | 9/2000 |
| WO | WO-01/22416 A1 | 3/2001 |
| WO | WO-01/93035 A2 | 12/2001 |
| WO | WO-03/007296 A1 | 1/2003 |
| WO | WO-03/025924 A1 | 3/2003 |
| WO | WO-03/030173 A | 4/2003 |
| WO | WO-03/079353 A1 | 9/2003 |
| WO | WO-2004/015707 A1 | 2/2004 |
| WO | WO-2004/015708 A1 | 2/2004 |
| WO | WO-2004/025648 | 3/2004 |
| WO | WO-2004/025649 | 3/2004 |
| WO | WO-2004/029668 A2 | 4/2004 |
| WO | WO-2004/029941 A2 | 4/2004 |
| WO | WO-2004/034396 A1 | 4/2004 |
| WO | WO-2004/036561 A1 | 4/2004 |
| WO | WO-2004/053872 A1 | 6/2004 |
| WO | WO-2004/053874 A1 | 6/2004 |
| WO | WO 2004/059648 A2 | 7/2004 |
| WO | WO-2004/068476 A1 | 8/2004 |
| WO | WO-2004/075180 A1 | 9/2004 |
| WO | WO 2004/077432 A1 | 9/2004 |
| WO | WO-2004/079631 A1 | 9/2004 |
| WO | WO-2004/079731 A1 | 9/2004 |
| WO | WO-2004/079740 A1 | 9/2004 |
| WO | WO 2004/081922 A | 9/2004 |
| WO | WO-2004/081926 A1 | 9/2004 |
| WO | WO-2004/093035 A1 | 10/2004 |
| WO | WO-2004/093065 A1 | 10/2004 |
| WO | WO-2004/100155 A1 | 11/2004 |
| WO | WO-2004/100156 A1 | 11/2004 |
| WO | WO-2005/004123 A1 | 1/2005 |
| WO | WO 2005/004154 A2 | 1/2005 |
| WO | WO 2005/013265 A1 | 2/2005 |
| WO | WO 2005/013266 A1 | 2/2005 |
| WO | WO 2005-062306 A1 | 7/2005 |
| WO | WO 2005/073971 A2 | 8/2005 |

OTHER PUBLICATIONS

Takashi Yokozeki, et al., "A Virtual Optical Disk Method to Realize Rewritability and Revision Control on a Write-Once Optical Disk"; Systems and Computer in Japan; New York, U.S., vol. 21, No. 8; pp. 34-43; Jan. 1, 1990; ISSN0882.

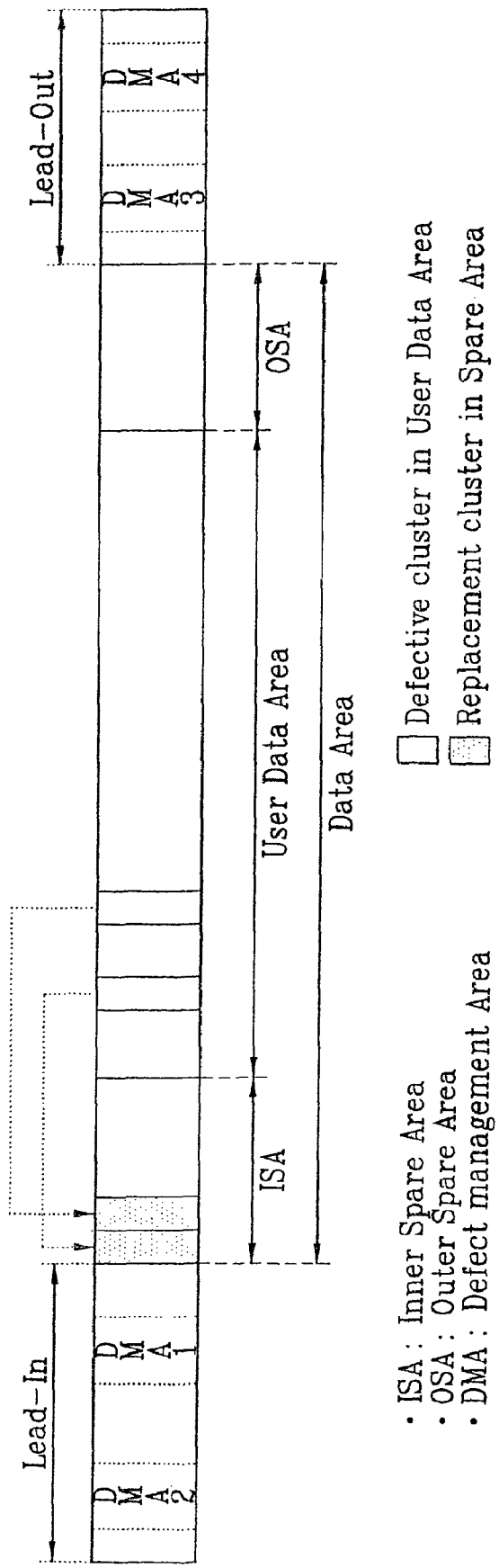

- TDFL : Temporary DFL
- TDDS : Temporary DDS (Disc Definition Structure)
- SBM : Space Bit-Map
- SRRI : Sequential Recording Range Information
- TDMS : Temporary Disc Management Structure

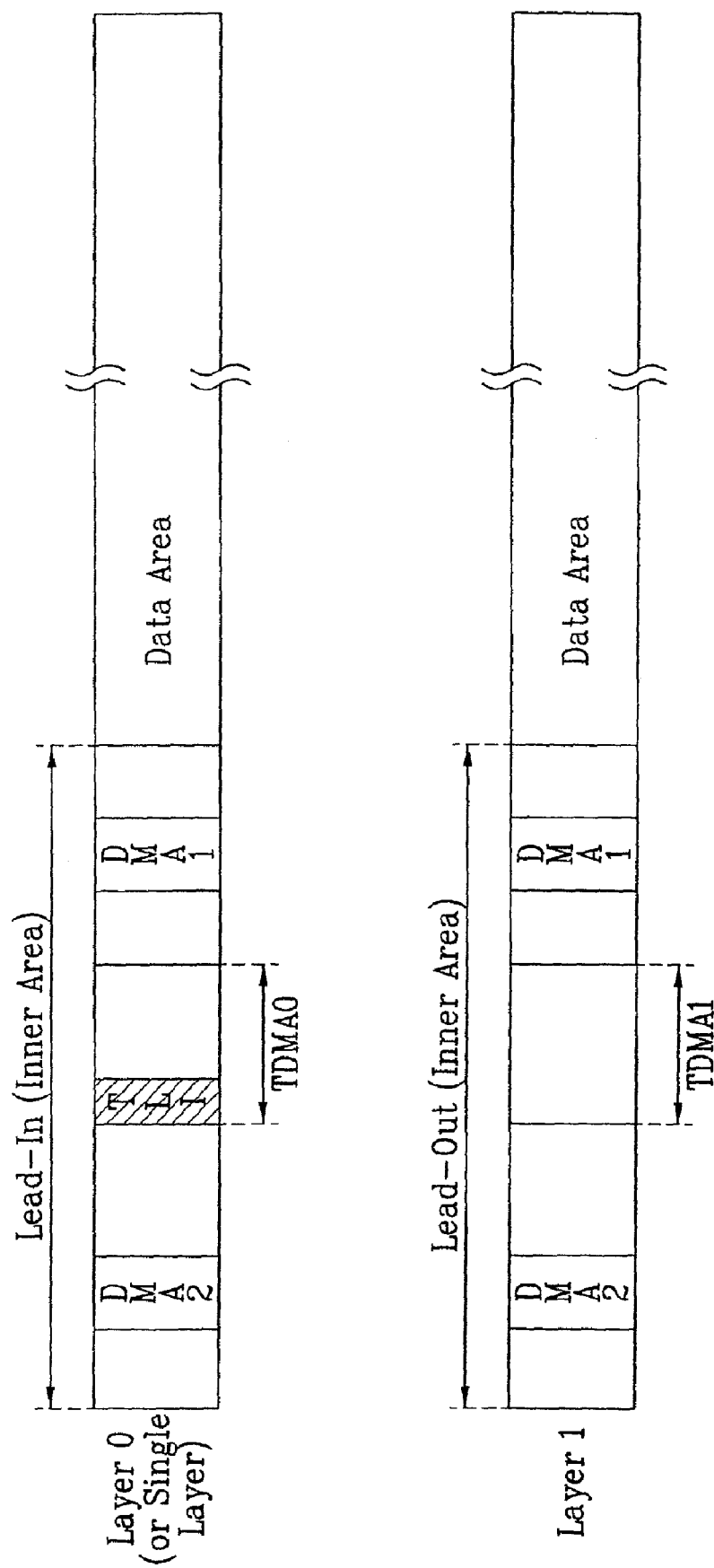

| contents | Number of Bytes | |
|---|---|---|
| TLI identifier = "TL" | 2 | — 82 |
| TLI format = 00h | 1 | — 83 |
| TLI update count | 4 | — 84 |
| Latest TDDS location | 1 | — 85 |
| Set to 00h | M | — 86 |
| Latest TDDS | 2048 | — 87 |
| Set to 00h (or Latest TDDS copied) | 30 * 2048 | — 88 |

Sector 0 spans rows 1–5; Sector 1 is Latest TDDS; Sectors 2 ~ Sector 31 is the last row. 1 cluster.

0000 0000 : TDMA 0
0000 0001 : TDMA 1
0000 0010 : TDMA 2
0000 0011 : TDMA 3
0000 0100 : TDMA 4 first TDDS recorded 32 times

Single Layer(expand SA mode) Disc

Dual Layer (expand SA mode) Disc

WRITE-ONCE OPTICAL DISC, AND METHOD AND APPARATUS FOR RECORDING/REPRODUCING MANAGEMENT INFORMATION ON/FROM OPTICAL DISC

This application is a continuation of U.S. application Ser. No. 11/984,034, filed on Nov. 13, 2007 now U.S. Pat. No. 7,570,559; which claims priority to U.S. application Ser. No. 10/911,728, filed on Aug. 5, 2004 now U.S. Pat. No. 7,317,670 under 35 U.S.C. §119; which claims the priority of Patent Application No. 2003-054165 filed in Republic of Korea on Aug. 5, 2003; Patent Application No. 2003-073088 filed in Republic of Korea on Oct. 20, 2003; and Patent Application No. 2004-007608 filed in Republic of Korea on Feb. 5, 2004. The entire contents of each of these applications are hereby incorporated by reference.

BACKGROUND OF THE INVENTION

1. Field of the Invention

The present invention relates to a write-once optical disc and an apparatus and method for recording/reproducing management information on/from the optical disc.

2. Discussion of the Related Art

As an optical recording medium, optical discs on which high-capacity data can be recorded are widely being used. Among them, a new high-density optical recording medium (HD-DVD), for example, a Blu-ray disc, has been recently developed for recording and storing high-definition video data and high-quality audio data for a long-term period.

The Blu-ray disc involves the next generation HD-DVD technology and is the next generation optical recording solution, which has an excellent capability to store data more than existing DVDs. Recently, a technical specification of an international standard for HD-DVD has been established. Various standards for Blu-ray discs are being prepared. Particularly the standards for a write-once Blu-ray disc (BD-WO) are being proposed.

FIG. 1 schematically illustrates the structure of a recording area of a rewritable Blu-ray disc (BD-RE) according to a related art. As shown in FIG. 1, the disc is divided into a lead-in area, a data area and a lead-out area, starting from an inner radius thereof. Further, the data area is provided with an inner spare area (ISA) and an outer spare area (OSA) respectively disposed at the inner and outer radiuses to replace defective areas, and a user data area provided between the spare areas to record user data therein.

If a defective area is generated in the user data area while data is recorded on the rewritable Blu-ray disc (BD-RE), data is transferred from the defective area to the spare area to replace and record data in the spare area. This portion of the spare area is known as a replacement area for replacing the defective area. Additionally, position information related to the defective area, that is, position information on the defective area and on the corresponding replacement area is recorded in defect management areas (DMA1, DMA2, DMA3, and DMA4), which are provided in the lead-in/out areas, to perform defect management. The BD-RE has a cluster as a minimal recording-unit. One cluster has a total of 32 sectors, and one sector has 2048 bytes.

Since rewriting can be performed in any area of the BD-RE, the entire area of the disc can be randomly used irrespective of a specific recording manner. Also, since the defect management information can be written, erased and rewritten in the defect management areas (DMAs), it does not matter that the size of the defect management area is small. In particular, the BD-RE allocates and uses 32 clusters for each of the defect management areas (DMAs).

On the other hand, in a write-once disc such as a BD-WO, writing can be only made once in a specific area of the disc and thus, the manner of recording is much limited. As such, defect management becomes one of the important matters when data is to be recorded on a high-density write-once disc such as a BD-WO. Accordingly, the write-once disc requires a management area to record therein information on defect management and on disc management. In this regard, the write-once optical disc requires a larger management area for recording information on the defect management and on the disc use state due to its unique 'write-once' characteristic.

However, a unified standard satisfying the above requirements is not available for a write-once disc such as a BD-WO. Further, any standard related to presently declared write-once optical discs cannot solve the above drawbacks.

SUMMARY OF THE INVENTION

Accordingly, the present invention is directed to a write-once optical disc, and an apparatus and method for recording/playing-back management information on/from the optical disc that substantially obviate one or more problems due to limitations and disadvantages of the related art.

An object of the present invention is to provide a method for recording disc management information on a write-once optical disc, a disc initializing method and a disc initial reproducing method.

Another object of the present invention is to provide a method for separately recording and managing management information, thereby enhancing the use efficiency of a plurality of temporary defect/disc management areas (TDMAs) provided on a write-once optical disc.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a recording medium having at least one recording layer, the recording medium comprising: a data area to record user data; a lead-in area and a lead-out area; and a plurality of temporary defect management areas (TDMAs), wherein at least one of the TDMAs includes an indicator identifying a usage status of the TDMAs.

In another aspect of the present invention, there is provided a write-once recording medium comprising: at least one recording layer; a lead-in area, a data area, and a lead-out area on the at least one recording layer; a separate indicator area in the lead-in area; and an indicator stored in the separate indicator area and identifying which one of temporary management areas on the write-once recording medium has an in-use status.

In a further another aspect of the present invention, there is provided a method of recording management information on a recording medium, the recording medium including a plurality of temporary defect management areas (TDMAs) on at least one recording layer, the method comprising: recording an indicator in at least one of the TDMAs, the indicator indicating which TDMA is in use.

In a still another aspect of the present invention, there is provided a method of recording management information on a write-once recording medium, the write-once recording medium including a lead-in area, a data area, and a lead-out area on at least one recording layer, the method comprising: allocating a separate indicator area in the lead-in area of the write-once recording medium; and recording an indicator in the separate indicator area, the indicator identifying which one of temporary management areas on the write-once recording medium has an in-use status.

In a still another aspect of the present invention, there is provide an apparatus for providing management information on a recording medium, the recording medium including a plurality of temporary defect management areas (TDMAs) on at least one recording layer, the apparatus comprising: a recording/reproducing part to record an indicator in at least one of the TDMAs, the indicator indicating which TDMA is an in-use TDMA.

In a still another aspect of the present invention, there is provided an apparatus for providing management information on a write-once recording medium, the write-once recording medium including a lead-in area, a data area, and a lead-out area on at least one recording layer, the apparatus comprising: a recording/reproducing part to allocate a separate indicator area in the lead-in area of the write-once recording medium, and to record an indicator in the separate indicator area, the indicator identifying which one of temporary management areas on the write-once recording medium has an in-use status.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a schematic view illustrating the structure of a BD-RE according to a related art;

FIGS. 7, 8 and 9 are views illustrating examples of different locations of a TLI on a single-layer write-once optical disc and on a dual-layer write-once optical disc according to an embodiment of the present invention;

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

For description convenience, a write-once optical disc is exemplified as a write-once Blu-ray disc (BD-WO).

Figure 2A:
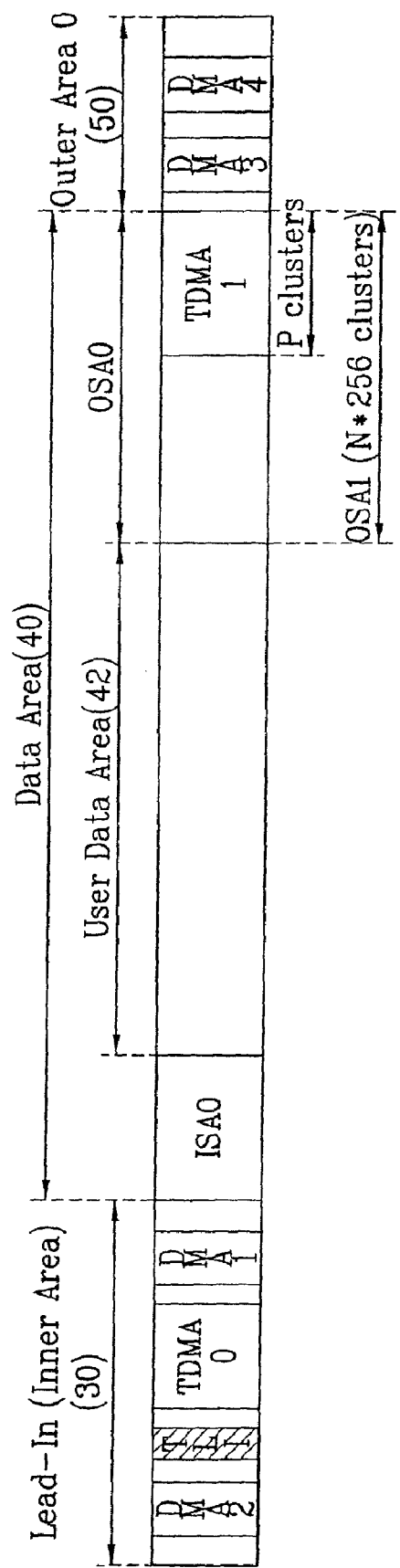
FIGS. 2A and 2B are views respectively illustrating a structure of a single-layer write-once optical disc and a structure of a dual-layer write-once optical disc according to an embodiment of the present invention.
Figure 2B:
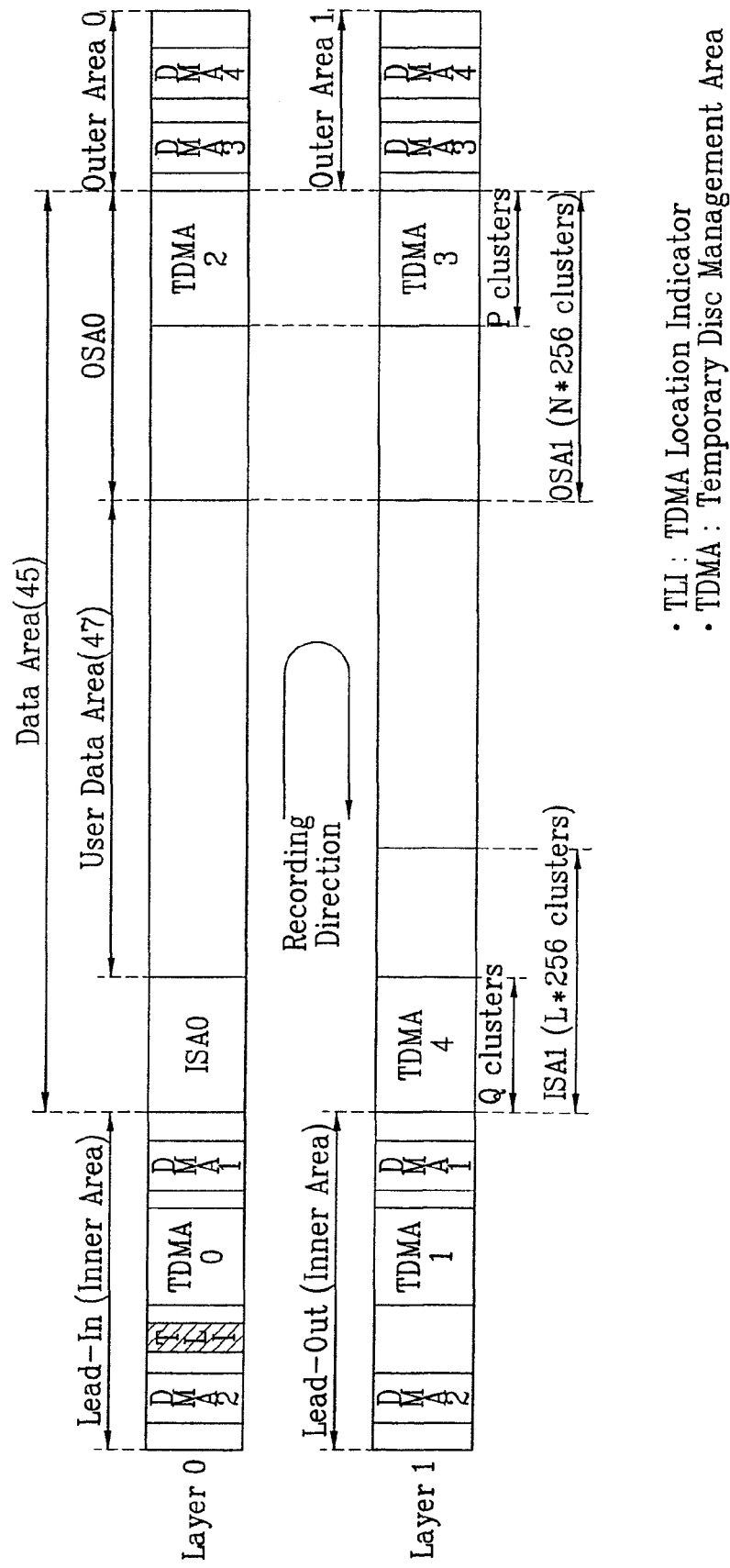
Figure 3:
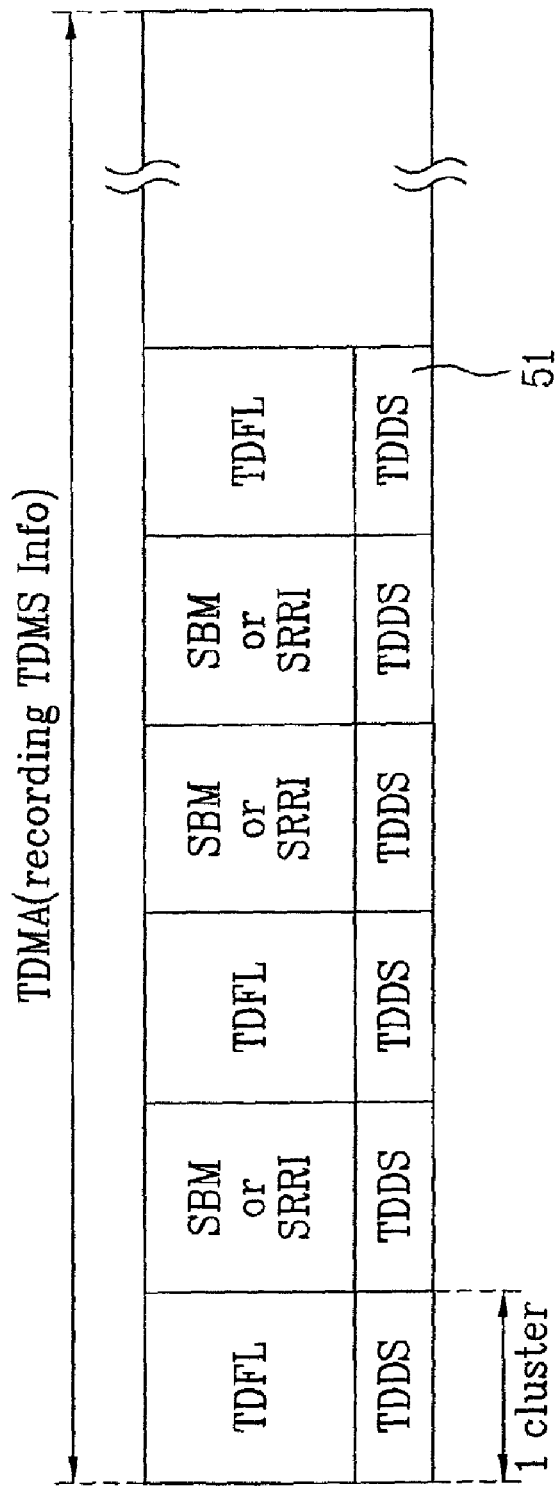
FIG. 3 is a view illustrating an example of information recorded in a temporary disc/defect management area (TDMA) of a write-once optical disc according to an embodiment of the present invention.

FIGS. 2A to 3 are views illustrating a structure of a write-once optical disc and a method for recording management information on the disc according to an embodiment of the present invention.

Particularly, FIG. 2A illustrates a single-layer write-once optical disc (e.g., a single-layer BD-WO) having one recording layer according to an embodiment of the present invention. As shown in FIG. 2A, the single-layer optical disc includes a lead-in area 30, a data area 40 and a lead-out area 50 in the inner to outer radius direction. The data area 40 includes inner and outer spare areas (ISA0) and (OSA0), and a user data area 42. The lead-in area 30 and the outer spare area OSA0 respectively include temporary disc/defect management areas (TDMA0) and (TDMA1).

In addition, a plurality of disc/defect management areas (DMA1~DMA4) are provided in the lead-in and lead-out areas 30 and 40. While the TDMAs store defect/disc management information temporarily, the DMAs store the defect/disc management information more permanently. For instance, when the disc is to be finalized, the management information stored in a TDMA is transferred to and stored in each of the DMAs.

FIG. 2B illustrates a dual-layer write-once optical disc (e.g., a dual-layer BD-WO) having two recording layers according to an embodiment of the present invention. As shown in FIG. 2B, the dual-layer optical disc includes a first recoding layer (Layer 0) and a second recording layer (Layer 1). Each of the recording layers includes management areas (Inner Areas) and (Outer Areas) in the inner and outer radius areas of the disc. The DMAs 1-4 are provided in each of the recording layers.

The dual-layer disc further includes a data area 45 in each of the recording layers, each data area having a user data area 47 for storing therein user data. Inner and outer spare areas ISA0 and OSA0 are provided in the data area 45 of the first recording layer (Layer 0). Inner and outer spare areas ISA1 and OSA1 are provided in the data area 45 of the second recording layer (Layer 1). The size of the ISA0 is fixed whereas the size of each of the OSA0, OSA1 and ISA1 is variable. For instance, the size of the ISA1 may be (L*256) clusters, and the size of the OSA0 and OSA1 may be (N*256) clusters, where N and L are positive integers.

As shown in FIG. 2B, the TDMAs on the dual-layer write-once disc include TDMA0 and TDMA1 each having a fixed size (for example, 2048 clusters) in the Inner Area, and TDMA2, TDMA3 and TDMA4 that are provided respectively in the spare areas OSA0, OSA1 and ISA1 having a variable size. The sizes of the variable TDMAs vary according to the sizes of the corresponding spare areas.

For the dual-layer disc, the TDMA0 and TDMA1 should be necessarily provided on the disc, whereas the TDMA2, TDMA3 and TDMA4 may be selectively allocated with their various sizes being, e.g., a ¼ size of the corresponding spare area. That is, the TDMA2 and TDMA3 may have appropriate sizes of P=N*256/4 clusters, and the TDMA 4 may have an appropriate size of Q=L*256/4 clusters, where N and L are positive integers. For the single-layer disc, the TDMA0 should be necessarily provided don the disc, while the TDMA1 may be selectively provided.

In accordance with an embodiment of the present invention, a single-layer write-once optical disc (e.g., a single-layer BD-WO) can have the maximum of 2 TDMAs. A dual-layer write-once optical disc (e.g., a dual-layer BD-WO) may have the maximum of 5 TDMAs.

Hereinafter, the structure and characteristics of the optical disc shown in FIGS. 2A and 2B are discussed. For description convenience, the dual-layer write-once optical disc is exemplified.

First, the write-once optical disc should include a plurality of areas for recording a variety of management information of the disc therein due to its write-once property. As such, the optical disc according to the present invention includes a plurality of TDMAs in addition to a plurality of DMAs.

According to the present invention, the plurality of TDMAs are used in a specific use sequence/order. For example, the TDMAs can be used in the sequence of the TDMA0 to TDMA4 in the dual-layer disc, or in the sequence of the TDMA0 and then the TDMA1 in the single-layer disc. For instance, in the case of the dual-layer disc, as user data recording is performed on the disc, appropriate information (e.g., TDDS, TDFL, etc. as shown in FIG. 3 to be discussed later) is recorded into the empty TDMA0 first. When the TDMA0 is full (i.e., fully used up) with such information recorded therein, then the empty TDMA1 is next used to record therein appropriate information associated with the user data recording. Once the TDMA1 is fully used up, then the TDMA2 is next used and so on. It is noted that the TDMAs can be used according to any designated sequence as desired. Identification numbers (TDMA0 to TDMA4) are given to the TDMAs in a serial sequence depending on a use sequence.

Furthermore, the write-once optical disc according to the present invention includes a separate area in which management information for managing the plurality of TDMAs is recorded. Such management information is referred to herein as a TDMA location indicator (TLI). The TLI can also be referred to as a TAI (TDMA access indicator). The TLI indicates which TDMA, among all the TDMAs that are to be used according to a designated sequence, is an "in-use TDMA". An "in-use TDMA" is a TDMA that is currently being used/accessed or that is currently available for use, among all the TDMAs having the designated use sequence. According to the various embodiments, the in-use TDMA indication by the TLI can be implemented using a TDMA in-use indicator or a TDMA full indicator, which will be discussed later in more detail.

The TLI allows an initial disc access time to be reduced greatly since the TLI identifies the in-use TDMA and thus, information on the last defect management and on the disc use state can be quickly obtained from the identified in-use TDMA. This is beneficial especially when the disc is initially loaded. Without the TLI, all the TDMAs have to be scanned to determine which TDMA is the in-use TDMA in order to obtain the necessary management information from that in-use TDMA.

The TLI according to the present invention can be provided in various areas of the disc. Specifically, the TLI can be provided anywhere in the management areas (the lead-in area, the lead-out area and the like) of the disc, which are accessible by an optical recording/reproducing apparatus to obtain a variety of disc information prior to the actual reproduction. In the single-layer disc of FIG. 2A, for instance, a TLI can be provided in the lead-in area 30. In the dual-layer disc of FIG. 2B, a TLI can be provided in the lead-in area at the first recording layer (Layer 0). Other examples of locations at which the TLI can be allocated will be discussed later.

FIG. 3 illustrates a variety of information on the disc defect management and on the disc use state, where this information is recorded in the TDMA(s). Whenever recording is performed on the disc, the recording is generally performed by more than one cluster, a cluster being generally a minimal recording-unit. Various disc management information recorded in the TDMA (e.g., TDM0, TDMA1, TDMA2, TDMA3, or TDMA4) is collectively referred to herein as TDMS (temporary disc management structure) information. The TDMS information can be changed or added depending on a standard.

As shown in FIG. 3, the TDMS information includes, but is not limited to, a Temporary Defect List (TDFL) for recording disc defect management information, a Sequential Recording Range Information (SRRI) applied in a sequential recording mode as information for representing the disc use state, a Space-Bit Map (SBM) applied in a random recording mode, and a Temporary Disc Definition Structure (TDDS) information including recent location information of the TDFL and the SRRI (or SBM). The SRRI and the SBM may not be concurrently used, and either the SRRI or SBM is recorded on the disc depending on the recording mode.

As an example, in the context of the disc structure shown in FIGS. 2A and 2B, each of the TDMA0~TDMA4 includes one or more TDFLs/SBMs/SRRIs each recorded with a TDDS in one cluster at each recording/updating time, as shown in FIG. 3. That is, each recording of a TDFL/SBM/SRRI with a TDDS is allotted one cluster. Generally, the last sector of each such cluster is designated to store therein the TDDS information as shown in FIG. 3. However, the first sector, instead of the last sector, of each such cluster can also be used to store the TDDS information.

The TDDS information includes general disc record/playback information, and is generally always checked at the time of loading the disc in the record/playback apparatus since it includes pointer information for indicating the recent locations of the TDFL and the SRRI (or SBM) as described above.

According to the disc use state, the TDDS information is continuously updated and the updated TDDS information is written in the TDMA at each update/recording time. Thus, the last TDDS (e.g., the last TDDS 51 in FIG. 3) in the latest TDMA used should be checked to access a variety of management information on a current disc use state.

As described above, the TDMAs for recording the TDMS information therein are used in a specific use sequence. For example, if the TDMA0 is all used up in updating the TDMS information according to a need, the next TDMA according to the use sequence, e.g., the TDMA1, is then used to store therein the updated TDMS information. The present invention provides a TLI (TDMA management information) which identifies which TDMA among all the TDMAs having the specific use sequence is the in-use TDMA, and this method according to various embodiments will be now described referring to FIGS. 4A-6C. The TLI structures and use of FIGS. 4A-6C are applicable to the TLIs and the disc structures shown in FIGS. 2A and 2B and subsequent FIGS. 7-11A and 12A, or to any other disc structure that needs a TLI.

Figure 4A:
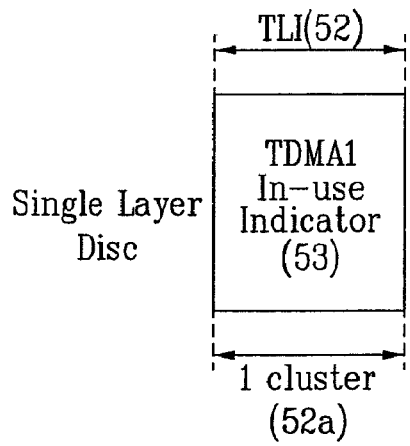
FIG. 4A is a view illustrating an example of a TDMA location indicator (TLI) of a single-layer write-once optical disc according to a first embodiment of the present invention.

FIGS. 4A to 4E illustrate the structure of a TLI according to a first embodiment of the present invention. This embodiment provides a TLI having one or more TDMA in-use indicators. More specifically, FIG. 4A illustrates the structure of a TLI in a single-layer write-once optical disc having one recording layer, and FIGS. 4B to 4E illustrate the structure of a TLI in a dual-layer write-once optical disc having two recording layers. Referring to FIG. 4A, assume that the single-layer write-once optical disc has two TDMAs (TDMA0) and (TDMA1), e.g., as shown in FIG. 2A and the TDMA0 and TDMA1 are used in that sequence. Then the TLI 52 includes a TDMA1 in-use indicator 53 having a size of a single recording-unit such as a single cluster 52a. The TLI 52 manages the two TDMAs with the one cluster 52a. The TDMA1 in-use indicator 53 indicates directly whether or not the corresponding TDMA1 is the in-use TDMA. This indication is implemented by providing certain recording in the one cluster 52a of the TLI 52. If the TLI cluster 52a has this certain recording therein, then the TLI cluster 52a is said to be in the 'recorded state'. If the TLI cluster 52a does not have this certain recording therein, then the TLI cluster 52a is not in the recorded state. If the TLI cluster 52a (the TDMA1 in-use indicator 53) is not in the recorded state, it means that the firstly used TDMA0 is the in-use-TDMA. If the TLI cluster 52a is in the recorded state, it means that the second used TDMA1 is the in-use-TDMA, which means the firstly used TDMA0 is full, i.e., fully used up, so that there is no recording space in the TDMA0.

In other words, if the firstly used TDMA0 becomes full, e.g., during the user data recording operation of the disc, then the TDMA1 according to the designated use sequence will be used to record data as the user data recording operation continues. At this point, designated certain data will be recorded into the TLI cluster 52a to place the TLI cluster 52a in the recorded state. The recorded state of the TLI cluster 52a indicates that the TDMA1, not the TDMA0, is now the in-use TDMA, i.e., currently available for use during the user data recording operation. Accordingly, by examining the recorded/unrecorded state of the TLI cluster(s), a recording/reproducing apparatus can identify quickly which TDMA can and should be currently used during a data recording operation of the disc. This reduces the disc access time greatly and provides an efficient and effective way to carry data recording operations of the disc.

According to the embodiments of the present invention, if the single-layer write-once disc has more than two TDMAs, then the total number of TLI clusters present in the TLI changes according to the total number of TDMAs present on the disc. For instance, if there is an X number of TDMAs on the disc, then there is an (X−1) number of TLI clusters in the TLI. Each of the TLI clusters corresponds to one of the TDMAs, generally excluding the first TDMA in the order of the TDMA use sequence.

According to the embodiments of the present invention, the recording of designated certain data into the TLI cluster(s) to place the TLI cluster(s) in the recorded state can be realized in many ways. For instance, a high frequency signal can be recorded in the TLI cluster(s) which would make it easier to check whether or not the TLI cluster(s) are in the recorded state. In other examples, dummy data or certain real data (not dummy data) can be recorded in the TLI clusters. An example of recording the real data in the TLI cluster(s) will be described later reference to FIGS. 10A and 10B.

Figure 4B:
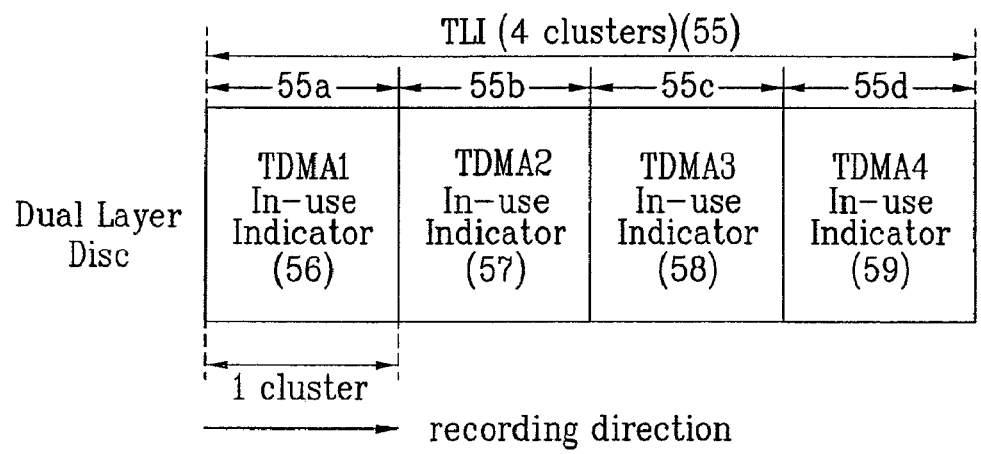
FIGS. 4B-4E are views illustrating examples of a TDMA location indicator (TLI) of a dual-layer write-once optical disc according to the first embodiment of the present invention.

The use and structure of the TLI for a dual-layer write-once optical disc according to the first embodiment of the present invention is as follows. Referring to FIG. 4B, the dual-layer write-once optical disc may have up to five TDMAs (TDMA0 to TDMA4) and thus, four clusters 55a-55d are allocated as a TLI 55, one TLI cluster corresponding to one of the TDMA1-TDMA4. In this example, the TDMAs are used sequentially from the TDMA0 to TDMA4. The first through fourth TLI clusters 55a-55d of the TLI correspond respectively to the TDMA1-TDMA4, and respectively represent TDMA1 to TDMA4 in-use indicators 56-59. Thus, these clusters 55a-55d are thus sequentially recorded in the increasing address (e.g., PSN) direction. This is indicated by the arrow ("recording direction") in FIG. 4B. That is, if a particular TLI cluster is in the recorded state, this implies automatically that any of its previous TLI clusters are already in the recorded state. For instance, if the second TLI cluster is in the recorded state, this means the first TLI cluster is already in the recorded state.

Accordingly, if all 4 clusters 55a-55d of the TLI are not in the recorded state, it means that the firstly used TDMA0 is the in-use-TDMA. If only the first TLI cluster 55a (TDMA1 in-use indicator 56) is in the recorded state, it means that the TDMA0 is full and the TDMA1 is the in-use TDMA. If the first and second TLI cluster 55b (TDMA2 in-use indicator 57) is in the recorded state, it means that the TDMA0 and TDMA1 are full and the TDMA2 is the in-use-TDMA. If the third TLI cluster 55c (TDMA3 in-use indicator 58) is in the recorded state, it means that the TDMA0-TDMA2 are full and the TDMA3 is the in-use-TDMA. If the fourth TLI cluster 55d (TDMA4 in-use indicator 59) is in the recorded state, it means that the TDMA0-TDMA3 are full and the TDMA4 is the in-use-TDMA.

Figure 4C:
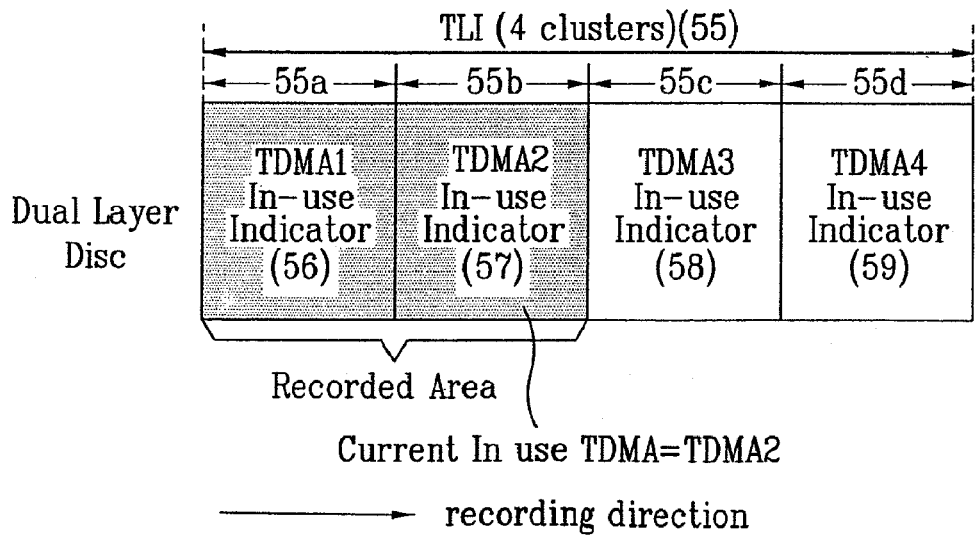

As an example, as shown in FIG. 4C, if the first and second TLI clusters 55a and 55b are in the recorded state, it means that the TDMA0 and TDMA1 are full and the in-use-TDMA is the TDMA2.

Accordingly, by checking the TLI and determining the TLI cluster(s) after the disc is loaded, the recording/reproducing apparatus can identify the location of the currently in-use TDMA (i.e., it can determine which TDMA is the in-use TDMA). Thus, the recording/reproducing apparatus can quickly move to a start location of the in-use TDMA to read the lastly recorded TDMS information, thereby initially obtaining a variety of initialization information for reproduction. If there is no TLI as in the related art, the recording/reproducing apparatus must scan all of the TDMAs beginning from the TDMA0 to determine which TDMA is currently available for use. And this creates a drawback that a long time is needed for initial reproduction.

Figure 4D:
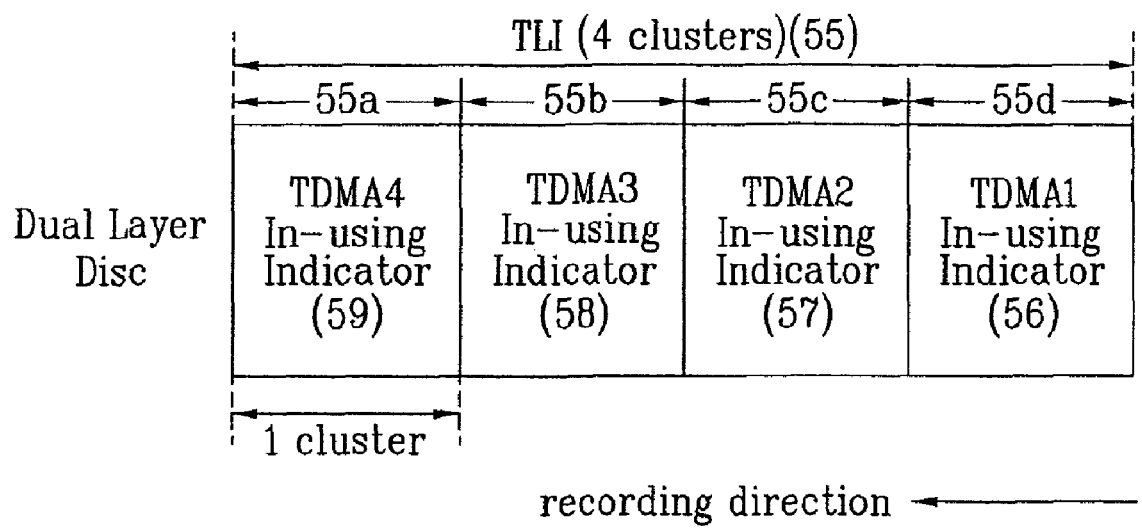

FIG. 4D illustrates a TLI structure of the dual-layer write-once disc in which the recording direction of the TLI clusters is reversed compared to the recording direction of the TLI clusters shown in FIG. 4B. Referring to FIG. 4D, in this example, the recording of the TLI 55 is sequentially performed from a cluster having a high Physical Sector Number (PSN) to a low PSN, i.e., from the fourth to the first TLI clusters 55d-55a. The first through fourth TLI clusters 55a-55d now correspond to the TDMA4 through TDMA1, respectively, and function as the TDMA4-TDMA1 in-use indicators 59-56, respectively. Here the TDMAs are used sequentially from the TDMA1 to TDMA4.

The use of the TLI recording direction of FIG. 4D is an effective way to eliminate interference with an Optimum Power Calibration (OPC) area (not shown) disposed adjacently to the corresponding CDMA in case the TLI exists at a head portion of the TDMA0 as shown in FIG. 7, which will be later described.

Figure 4E:
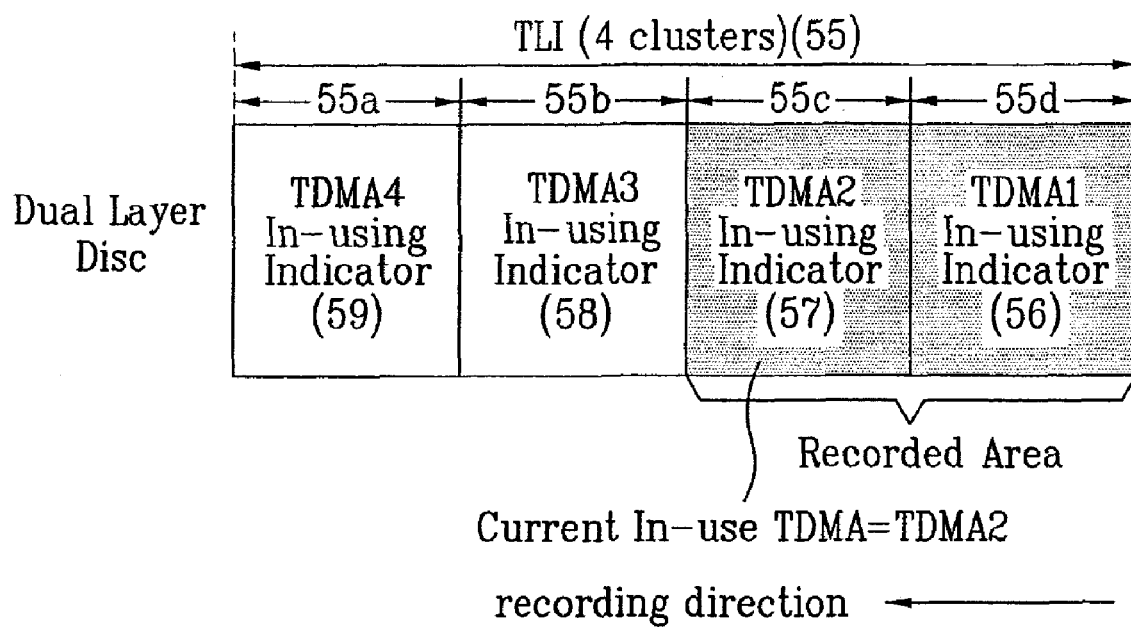

As an example of use of the TLI of FIG. 4D, in FIG. 4E, if the fourth and third TLI clusters 55d and 55c are in the recorded state, it means that the TDMA0 and TDMA1 are full and the usable TDMA (in-use) is the TDMA2.

Figure 5A:
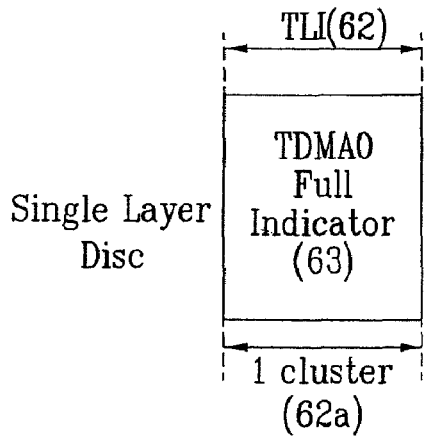
FIG. 5A is a view illustrating an example of a TLI of a single-layer write-once optical disc according to a second embodiment of the present invention.
Figure 5B:
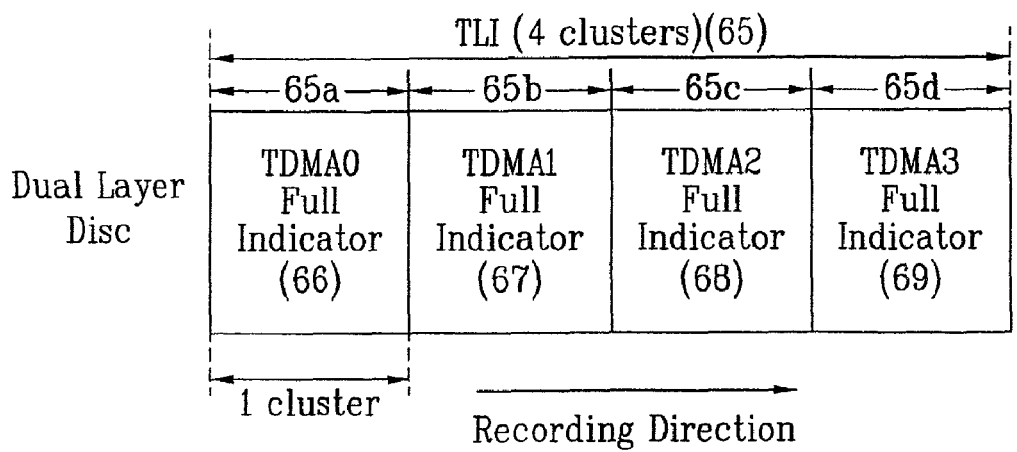
FIGS. 5B and 5C are views illustrating an example of a TLI of a dual-layer write-once optical disc according to the second embodiment of the present invention.
Figure 5C:
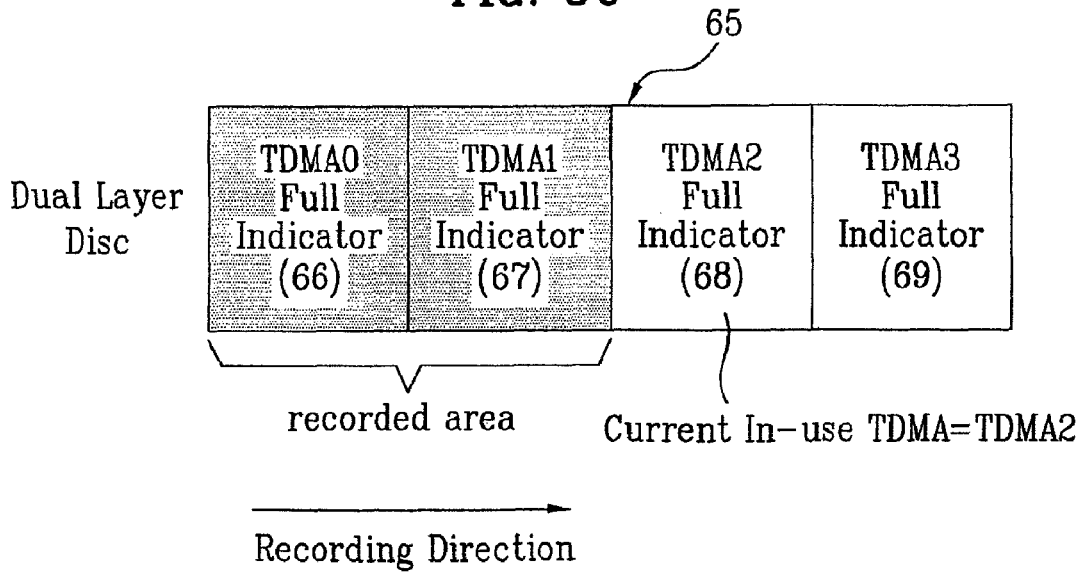

FIGS. 5A to 5C illustrate the structure of a TLI according to a second embodiment of the present invention. In this embodiment, the TLI indicates which TDMA is the in-use TDMA by indicating which TDMA(s) are full. More specifically, FIG. 5A illustrates the TLI structure of the single-layer write-once optical disc and FIGS. 5B and 5C illustrate the TLI structure of the dual-layer write-once optical disc. In these examples, assume that the TDMAs are used sequentially from the TDMA0 to the TDMA1 (single-layer disc), or to the TDMA4 (dual-layer disc) as discussed above.

As shown in FIG. 5A, in the example of the single-layer disc, a single cluster 62a is allocated for a TLI 62. This cluster 62a functions as a TDMA0 full indicator 63. In other words, if the TDMA0 is full, the TLI cluster 62a (TDMA0 full indicator 63) is indicated as being in the recorded state. This means that the TDMA1 is the in-use TDMA and can be used. If the TLI cluster 62a is not in the recorded state, it means that the TDMA0 is not yet fully used up and is available for use. That is, the TDMA0 is the in-use TDMA and can be used.

As shown in FIG. 5B, in the dual-layers write-once disc, first through fourth clusters 65a-65d are allocated for a TLI 65 and are recorded sequentially in that order in this example. The first to fourth cluster 65a-65d correspond to the TDMA0 to TDMA3, respectively, and function as TDMA0-TMDA3 full indicators 66-69, respectively. Each TLI cluster indicates whether or not the corresponding TDMA if full.

Accordingly, for instance, whenever the TDMA0 to TDMA3 are full, all four clusters 65a-65d of the TLI 65 would be in the recorded state, which means the TDMA4 is the in-use TDMA. If no TLI cluster is in the recorded state, it means that the TDMA0 is the in-use TDMA. If only the first TLI cluster 65a is in the recorded state, it means that the TDMA0 is full and the in-use-TDMA is the TDMA1. If only the first and second TLI clusters 65a and 65b are in the recorded state as shown in FIG. 5C, it means that the TDMA0 and TDMA1 are fully used and the TDMA2 is currently available for use.

Figure 6A:
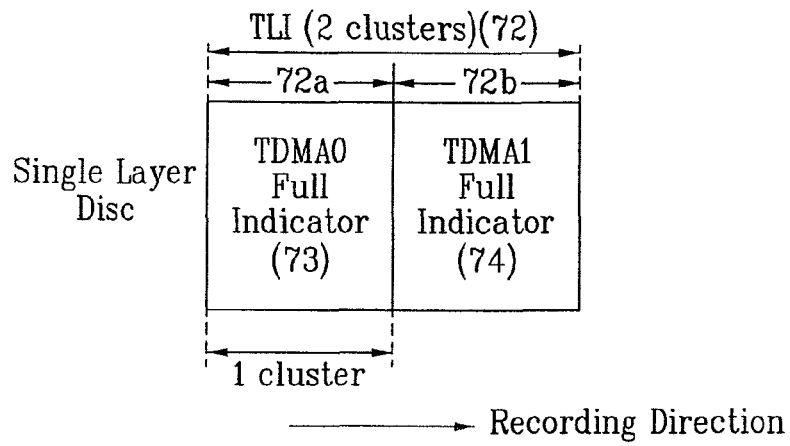
FIG. 6A is a view illustrating an example of a TLI of a single-layer write-once optical disc according to a third embodiment of the present invention.
Figure 6B:
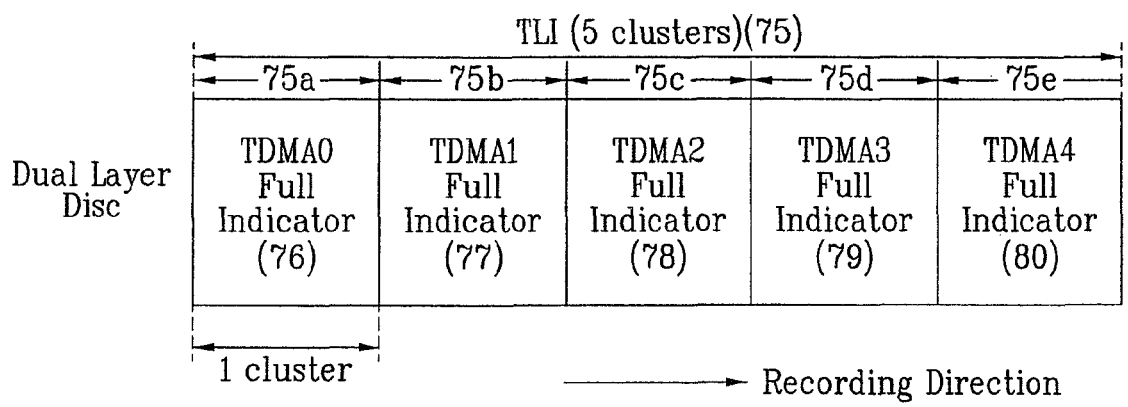
FIGS. 6B and 6C are views illustrating an example of a TLI of a dual-layer write-once optical disc according to the third embodiment of the present invention.
Figure 6C:
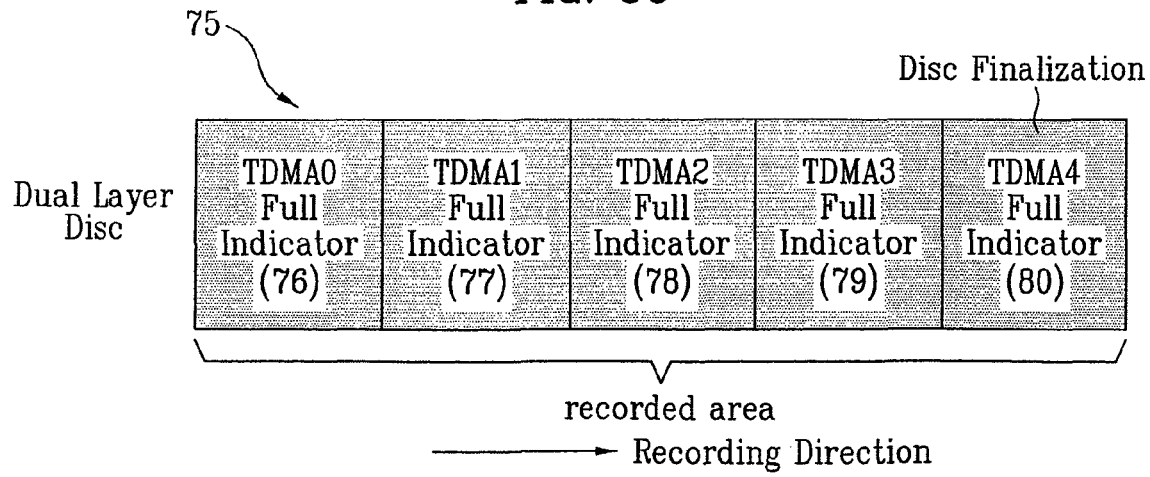

FIGS. 6A to 6C illustrate the structure of a TLI according to a third embodiment of the present invention. In the third embodiment, the TLI indicates which TDMA is the in-use TDMA by indicating which TDMA(s) are full. A difference from the second embodiment is that the TLI includes an additional TLI cluster. In the example of FIGS. 6A-6C, assume that the TDMAs are used sequentially from the TDMA0 to the TDMA1 (single-layer disc), or to the TDMA4 (dual-layer disc) as discussed above.

As shown in FIG. 6A, in the example of the single-layer disc, two clusters 72a and 72b are allocated for a TLI 72. The first and second TLI clusters 72a and 72b function respectively as a TDMA0 full indicator 73 and a TDMA1 full indicator 74. Accordingly, if only the TDMA0 is full, the first TLI cluster 72a (TDMA0 full indicator 73) alone is indicated as being in the recorded state. This means that the TDMA1 is the in-use TDMA and can be used. If the first TLI cluster 72a is not in the recorded state, it means that the TDMA0 is not yet full and is available for use. That is, the TDMA0 is the in-use TDMA and can be used. If both the first and second TLI clusters 72a and 72a are in the recorded state, then the TDMA0 and TDMA1 are all full, which means there is no TDMA available for recording management information. In this case, the disc should be closed/finalized.

As shown in FIG. 6B, in the dual-layers write-once disc, first through fifth clusters 75a-75e are allocated for a TLI 75 and are recorded sequentially in that order in this example. The first to fifth cluster 75a-75e correspond to the TDMA0 to TDMA4, respectively, and function as TDMA0-TMDA4 full indicators 76-80, respectively. Each TLI cluster indicates whether or not the corresponding TDMA if full.

Accordingly, for instance, if no TLI cluster is in the recorded state, it means that the TDMA0 is the in-use TDMA. If only the first TLI cluster 75a is in the recorded state, it means that the TDMA0 is full and the in-use-TDMA is the TDMA1. If only the first and second TLI clusters 75a and 75b are in the recorded state, it means that the TDMA0 and TDMA1 are fully used and the TDMA2 is currently available for use. If all five TLI clusters 75a-75e are in the recorded state as shown in FIG. 6C, it means that the TDMA0 to the TDMA4 are all fully used up and there is no usable TDMA. In this case, since the corresponding disc has no area for recording the TDMS information therein, the disc is finalized/closed.

FIGS. 5A to 6C illustrate the TLI used in a sequence starting from the TLI cluster having a low PSN to the TLI cluster having a high PSN. However, the recording direction of the TLI in FIGS. 5A-6C can be changed so that the TLI clusters are used sequentially in the order of decreasing address as shown in FIGS. 4D and 4E.

Figure 8:
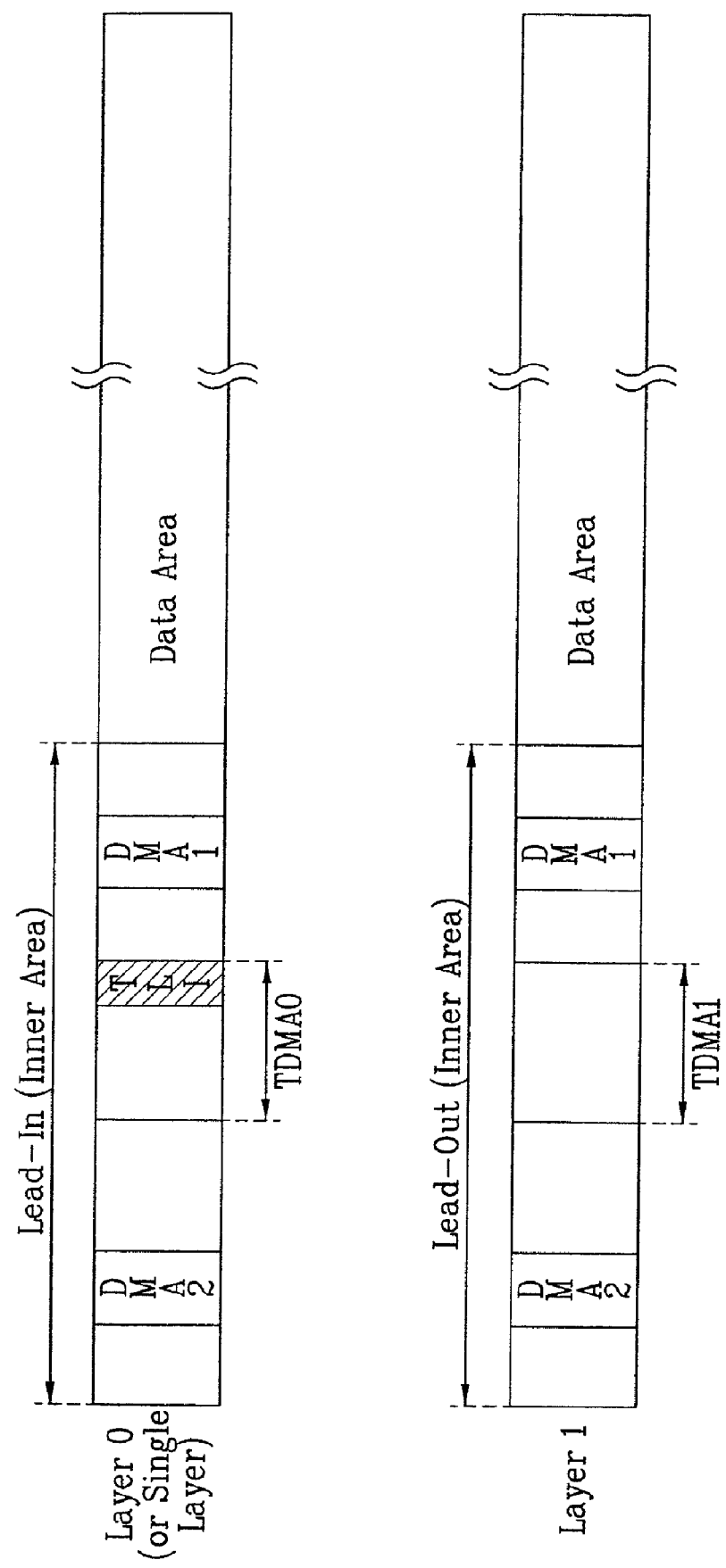
Figure 9:
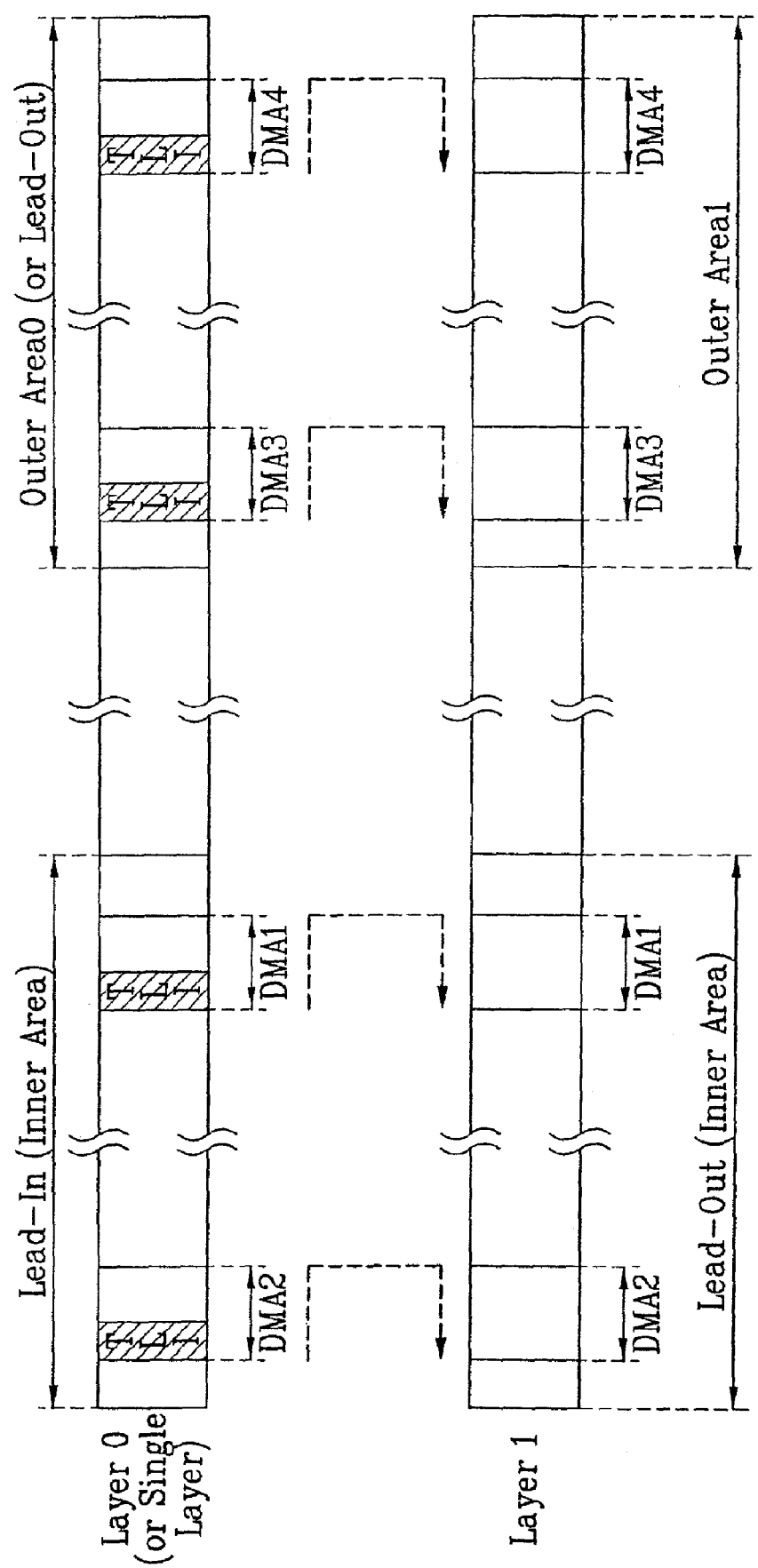

As discussed previously, the TLI (e.g., as shown in FIGS. 4A-6C) can be located in the lead-in area of the single layer or dual-layer disc as shown in FIGS. 2A and 2B. FIGS. 7 to 9 now illustrate different locations at which the management information (TLI) can be recorded on the disc according to an embodiment of the present invention. As shown in the examples of FIGS. 2A, 2B and 7-9, any location of the TLI on the disc is acceptable if it is located within an area which a recording/reproducing apparatus can initially recognize as the management area. In this regard, the data area of the disc may be excluded.

For instance, as shown in FIG. 7, the TLI is provided at the head portion of the TDMA0 on a single-layer (Layer 0) write-once optical disc or on a dual layer (Layers 0 and 1) write-once optical disc, such as a single-layer or dual-layer BD-WO. In the alternative, as shown in FIG. 8, the TLI can be provided at the end portion of the TDMA0 of the single-layer/dual-layer write-once disc. As another alternative, as shown in FIG. 9, the TLI can be provided within one, some or each of the DMAs of the single-layer/dual-layer write-once disc.

Figures 10A, 10B:
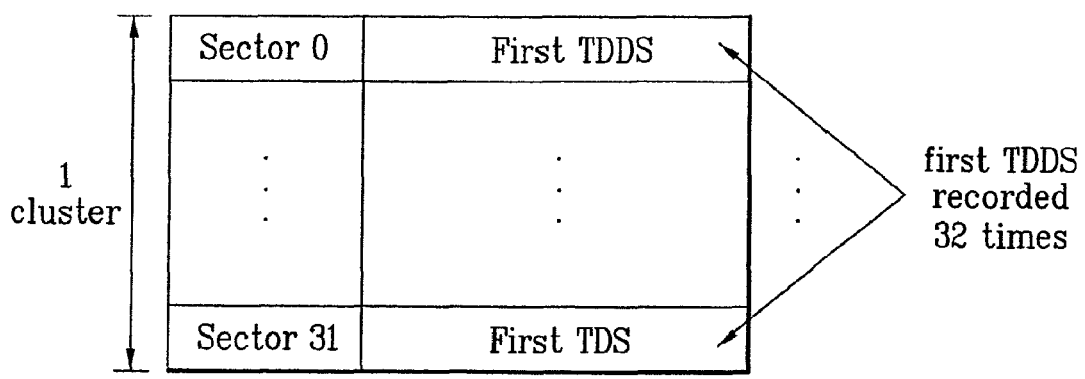
FIGS. 10A and 10B are views illustrating information recorded in a TLI according to an embodiment of the present invention.

FIGS. 10A and 10B illustrate two examples of different contents of the TLI according to an embodiment of the present invention. Although FIGS. 10A and 10B show one TLI cluster, each cluster of the TLI can have the same content structure. Particularly, FIGS. 10A and 10B are examples of recording certain real data into the TLI cluster(s) to selectively place the TLI cluster(s) into the recorded state. Some or all of such real data recorded in the TLI can be directly used to indicate whether or not the TLI cluster(s) is in the recorded state so as to identify the in-use TDMA as discussed above. The use of such real data has an advantage in that additional relevant information can be provided by the TLI in addition to the indication of the current in-use TDMA. It should be noted, however, that dummy data or any other designated signals can be recorded into the TLI cluster(s) to indicate the recorded/ unrecorded state of the TLI cluster(s). The TLI content structures of FIGS. 10A and 10B are applicable to the TLI and disc structures shown in FIGS. 2A-9 and 11A-13B.

According to one example as shown in FIG. 10A, the TLI cluster, which corresponds to a particular TDMA as discussed above, includes the latest TDDS information associated with the TDMA corresponding to the TLI cluster, in addition to the information indicating whether the corresponding TDMA is the in-use TDMA. The features of FIG. 10A are particularly useful in the second embodiment (FIGS. 5A to 5C) and the third embodiment (FIGS. 6A to 6C). For example, in case where the last TDDS is recorded in the last cluster of each TDMA, the TDMA including the latest TDDS and the in-use-TDMA can be different from each other, which in turn can cause errors when accessing the disc. By providing the additional information in the TLI as in FIG. 10A, such an error can be prevented.

A detailed description of this situation is as follows by referring to FIG. 10A. First, assume that the TLI is recorded in cluster units, a cluster being the minimal recording-unit. In the first sector (Sector 0) of the TLI cluster having 32 sectors, there exist an identification field 82 ("TLI identifier") for allowing the recognition of the TLI information, a TLI format information field 83 ("TLI format") related with a version of the current disc, and a TLI update count field 84 ("TLI update count") for increasing a count value by 1 whenever the TLI is updated. The update count field 84 can also be used even as the information for indicating how many clusters may be present within the TLI. Further, there exists a TDDS location field 85 ("Latest TDDS location") for providing information on the TDMA in which the latest TDDS information is located.

The remaining area 86 of the first sector (Sector0) of the TLI cluster is used to indicate the recorded or unrecorded state of the TLI cluster by using a predetermined value (for example, setting the field to "00h"). For instance, if the remaining area 86 of Sector 0 of the TLI cluster has certain designated recording, that the TLI cluster can be said to be in the recorded state to indicate the usage status of the corresponding TDMA as discussed above in connection with FIGS. 4A-6C.

The TDDS location field 85 in the first sector (Sector 0) of the TLI cluster identifies a TDMA in which the latest TDDS information is recorded irrespective of whether or not that TDMA is fully used up. For example, the values of this field 85 can be defined so that "0000 0000b" means the latest TDDS exists in the TDMA0, "0000 0001b" means the latest TDDS exists in the TDMA2, "0000 0011b" means the latest TDDS exists in the TDMA3, and "0000 001b" means the latest TDDS exists in the TDMA4. Other examples are possible. Accordingly, as an example, if the first cluster within the TLI alone is in the recorded state (e.g., the area 86 of the first TLI cluster 65a in FIG. 5B is in the recorded state) and the TDDS location field 84 (i.e., of the first TLI cluster 65a in FIG. 5B) has a value of "0000 0000b", it means the usable TDMA is the TDMA1, but the last updated TDDS (latest TDDS information) is located within the TDMA0 on the disc.

In addition, the latest TDDS information is recorded into a TDDS information field 87 ("Latest TDDS") of the second sector (Sector 1 of the TLI cluster). As a result, the TLI can be utilized even for recovering the latest TDDS information directly. This is advantageous since, even if the latest TDDS information recorded in the latest TDMA as part of the TDMS information is damaged, the important TDDS information will not be lost since it can recovered from the TLI recorded in the TDMA0. Some or all of the remaining sectors (88) of the TLI cluster can have a copy of the latest TDDS information stored in the TDDS information field 87. Each TDDS information is recorded in one sector size. Thus, for instance, if 3 sectors of the TLI cluster are each recorded with the same latest TDDS information, this means that the latest TDDS information is stored three times in the TLI.

The latest TDDS information stored in the field 87 of the TLI cluster can be the last TDDS information or the first TDDS information. For instance, if the TLI cluster utilizes a TDMA in-use indicator instead of a TDMA full indicator and the TDMA corresponding to the TLI cluster becomes the in-use TDMA, then recording in the field 86 is made to indicate that the corresponding TDMA is currently in use. At this time, the first TDDS information recorded in the corresponding TDMA is copied and recorded into the TDDS information field 87 of the TLI cluster as the latest TDDS information. The first TDDS information is recorded in the field 87 because the corresponding TDMA is still in use and is not full at that time.

On the other hand, if the TLI cluster utilizes a TDMA full indicator instead of a TDMA in-use indicator and the TDMA corresponding to the TLI cluster becomes full, then recording in the field 86 is made to indicate that the corresponding TDMA is full. At this time, the last TDDS information (in the last sector) recorded in the corresponding TDMA is copied and recorded into the TDDS information field 87 of the TLI cluster as the latest TDDS information. The last TDDS information of the corresponding TDMA is recorded in the field 87 because the corresponding TDMA is full and no additional TDDS information cannot be recorded into the corresponding TDMA.

Accordingly, according to a time point when the TLI is updated, the latest TDDS information recorded in the TLI can be the last TDDS recorded within the corresponding TDMA (e.g., when the corresponding TDMA is full), or can be the first TDDS recorded within the in-use-TDMA (i.e., when the corresponding TDMA is currently available for use).

As another example, the latest TDDS information can be copied up to 32 times into the TLI cluster. Any remaining sector of the TLI cluster can be set to a certain value such as 00h if it is not used. Since each TDDS information recording is allotted with one sector size, this means the entire TLI cluster can be recorded with the same latest TDDS information up to 32 times as shown in FIG. 10B. Again, depending on the type (in-use or full) of indicator used in the TLI cluster, the latest TDDS information can be the first or last TDDS information recorded in the corresponding TDMA as discussed above. In the example of FIG. 10B, the recording of the latest TDDS information is directly used as the TDMA in-use/full indicator of the TLI cluster. This is an example of using the recording of real data (such as the TDDS information) in the TLI cluster to selectively indicate whether or not the TLI cluster is in the recorded state. Thus, the TLI cluster, not only indicates which TDMA is the in-use TDMA, but also provides the latest TDDS information associated with the corresponding TDMA.

The TLI content structure shown in FIG. 10B is useful in the first embodiment (FIGS. 4A to 4E). For example, if the in-use-TDMA is the TDMA1, the corresponding TLI cluster is placed in the recorded state. At this time, the first TDDS information recorded in the corresponding TDMA1 is recorded in that TLI cluster.

Figure 11A:
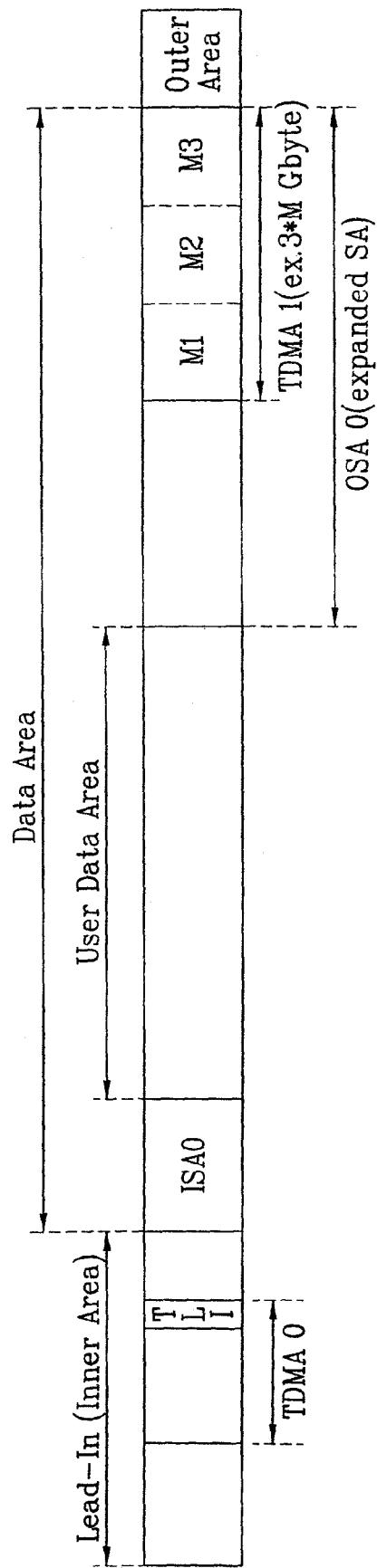
FIGS. 11A and 11B are views illustrating the structure of a single-layer write-once optical disc having an expanded spare area and a TLI area according to an embodiment of the present invention.

FIG. 11A to 13B illustrate the disc structure and the TLI structure according to another embodiment of the present invention. In this embodiment, in case where a spare area (SA) is allocated in an expanded SA mode, the location of the in-use-TDMA is not only indicated, but also an in-use duration/area is indicated among the areas/durations of the TDMA existing within the expanded spare area. Particularly, FIGS. 11A and 11B illustrate the structure and use of a TLI in the single-layer write-once optical disc, and FIGS. 12A-13B illustrate the structure and use of a TLI in the dual-layer write-once optical disc. In these examples, the in-use indicators, in stead of the full indicators, are used in the TLI.

More specifically, FIG. 11A illustrates the structure of the signal-layer write-once optical disc having an expanded spare area (SA) and the TDMA0 and TDMA1 used in that sequence. The expanded SA or the expansion of the spare area means that the spare area (e.g., OSA0) existing following the end of the user data area is allocated with the size falling within 50% of the maximal disc recording capacity by considering a future utilization when the disc is initialized. As the outer spare area (OSA0) is expanded, the TDMA1 existing within the outer spare area (OSA0) is expanded together.

In case where the TDMA1 is expanded in a specific size, the corresponding areas of the TDMA1 can be expanded accordingly. The expanded TMDA1 areas are respectively indicated as "M1", "M2" and "M3" in FIGS. 11A and 11B. In this case, the TLI is divided into a portion 90 ("TLI1") for indicating which TDMA is the in-use TDMA and a portion 91 ("TLI2") for indicating a specific duration within the expanded TDMA1. The TLI1 is has the size of one cluster, whereas the TLI2 has the size of two clusters.

If the TDMA1 has a greatly larger size than the TDMA0, e.g., due to the SA expansion and if the TLI 90 (without the portion 91) alone is allocated as the TLI, then the TDMA1 may need to be scanned from the beginning to locate the last recorded location within the TDMA1 because of its large size when the TDMA1 becomes the in-use TDMA. This, however, can cause a drawback in that a long access time is required. Therefore, the present invention according to this embodiment divides the expanded TDMA1 into a plurality of durations (or areas), and in case where the corresponding TDMA1 duration/area is fully used, this status is indicated in the TLI by the portion 91. This can reduce the disc access time significantly.

Figure 11B:
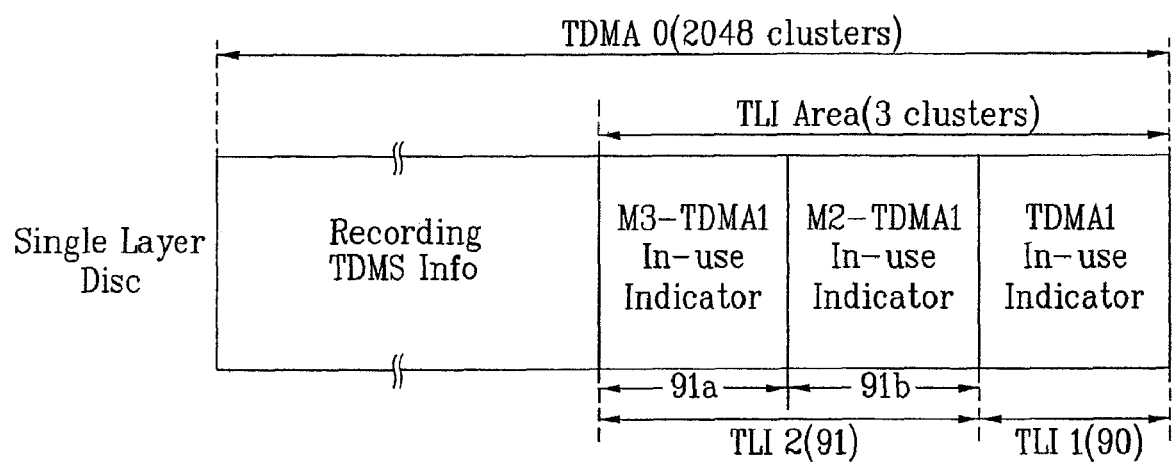

For instance, in FIG. 11A, assume that the expanded TDMA1 is divided into three same-sized durations/areas (M1, M2 and M3). Two clusters 91a and 91b are then allocated for the recording of the TLI2 (91) as shown in FIG. 11B as an example. The two clusters 91a and 91b of the TLI2 (91) correspond respectively to the M3 and M2 of the TDMA1 and indicate whether the corresponding area (M3 or M2) is currently in-use. The manner in which the clusters 91a and 91b are used to indicate the availability of the different TDMA areas/durations can be the same as the different ways of indicating the usage status of each TDMA as discussed above in connection with FIGS. 4A-6C and 10A-10B. For instance, if the TLI1 (90) indicates that the TDMA1 is the in-use TDMA, the M2-TDMA1 in-use indicator (91b) indicates whether or not the M2 of the TDMA1 is currently the in-use TDMA area; and the M3-TDMA1 in-use indicator (91a) indicates whether or not the M3 of the TDMA1 is currently the in-use TDMA area out of the TDMA1. As an example, if the TLI1 (90) and both clusters (91a and 91b) of the TLI2 (91) are detected to be in the recorded state, this means that the M3 of the TDMA1 is currently the in-use area of the TDMA1.

If the expanded TDMA1 is divided into an "m" number of the same-sized durations/areas (M1, M2, ..., Mm), the (m−1) number of clusters are allocated for the recording of the TLI2 (91). Although the TLI2 is used to indicate the usage status of the areas of the TDMA1 in the example of FIG. 11B, the TLI2 can be used to indicate the usage status of the areas of any TDMA that is expanded according to the expansion of the corresponding SA.

In FIGS. 11A and 11B, the location at which the TLI is recorded on the disc will be within a specific management area, e.g., as shown in any one of FIGS. 7 to 9. However, for description convenience, the TLI (=TLI1+TLI2) is shown in FIG. 11A to be located at the end portion of the TDMA0, for example. For description convenience, the TLI structure illustrates in FIG. 11B the case where the in-use TDMA is indicated as shown in the first embodiment (FIGS. 4A to 4E).

Figure 12A:
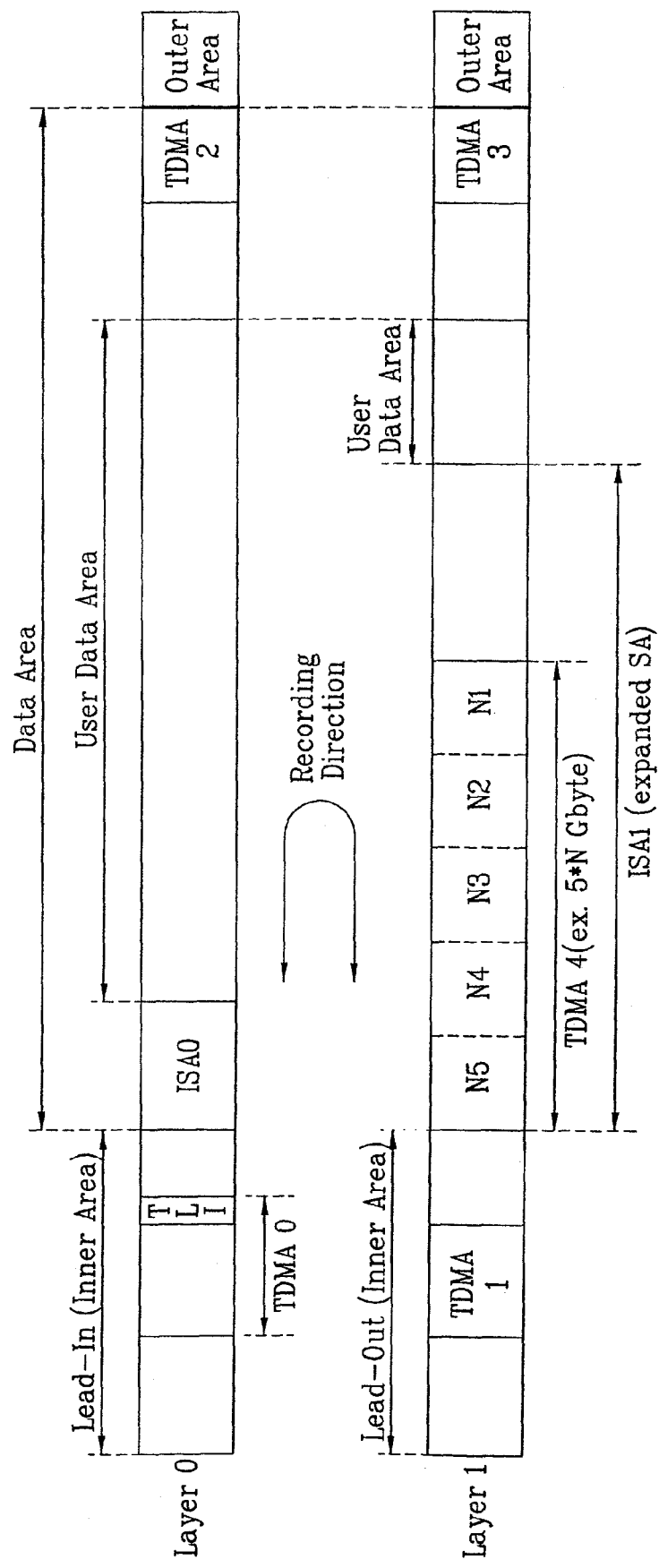
FIGS. 12A, 12B, 13A and 13B are views illustrating the structure of a dual-layer write-once optical disc having an expanded spare area and a TLI area according to an embodiment of the present invention.

FIG. 12A illustrates the structure of a dual-layer write-once optical disc having an expanded SA and the TDMA0-TMDA4. In the dual-layer optical disc, the spare area existing following the end portion of the user data area is the inner spare area (ISA1) at the second recording layer (Layer1). Therefore, the spare area (ISA1) may be expanded to have the size falling within 50% of the maximal disc recording capacity. As the spare area (ISA1) is expanded, the TDMA4 existing within the spare area (ISA1) is also expanded together. It is also possible to expand any other variable spare area on the disc with the TDMA therein also expanded.

Figure 12B:
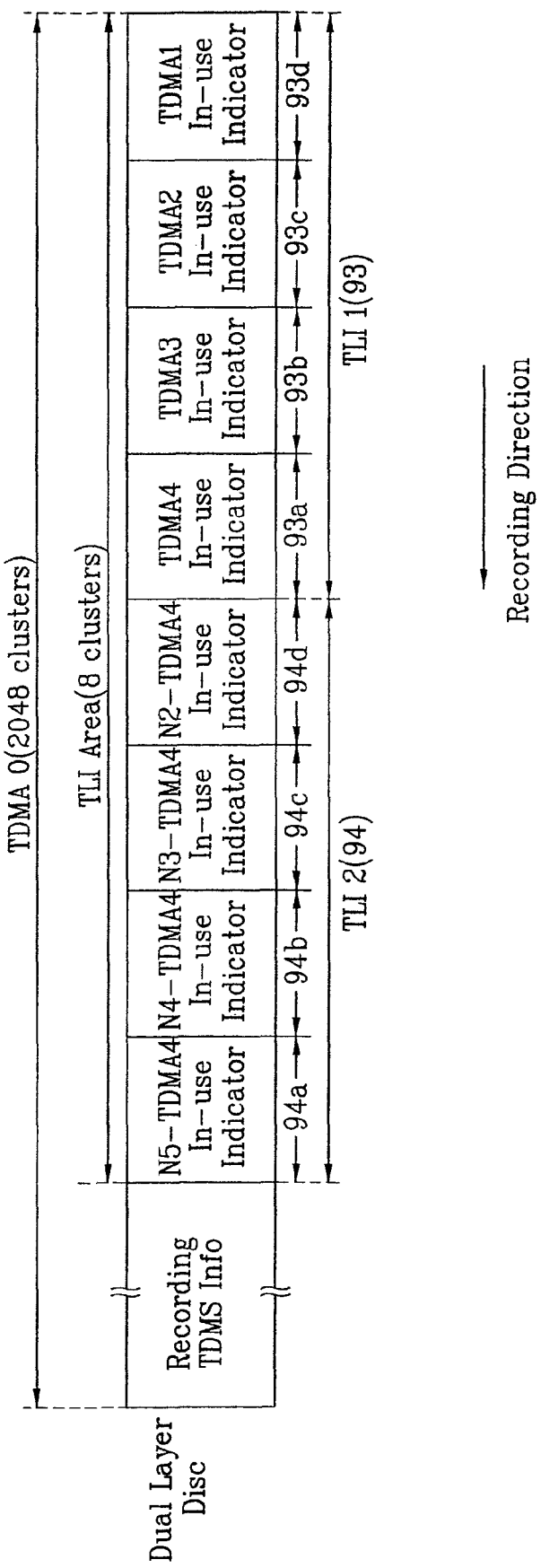

As shown in FIG. 12A, in case where the TDMA4 is expanded to a specific size, the TDMA4 is divided into a specific number of same-sized durations/areas. These durations/areas are respectively identified as N1, N2, . . . , N5. Accordingly, the TDMA0 includes a TLI as shown in FIG. 12B. The TLI includes a TLI1 (93) for indicating which TDMA is the in-use TDMA by using four clusters 93a-93d, and a TLI2 (94) for indicating the specific usage status of the durations/areas of the expanded TDMA4 by using four clusters 94a-94d. If the expanded TDMA4 is divided into an "n" number of the same-sized durations/areas (N1, N2, . . . , Nn) as described in FIGS. 12A and 12B, the (n−1) number of clusters is allocated for recording of the TLI2 (94).

The first to fourth clusters 93a-93d of the TLI1 (93) correspond respectively to the TDMA4-TDMA1 and function respectively as the TDMA4-TDMA1 in-use indicators. The first to fourth clusters 94a-94d of the TLI2 (94) correspond respectively to the N5-N2 of the TDMA1 and indicate whether the corresponding area (N5, N4, N3 or N2) is currently in-use. The manner in which these TLI clusters 93 and 94 are used to indicate the availability of the different TDMA and TDMA areas/durations can be the same as the different ways of indicating the usage status of each TDMA as discussed above in connection with FIGS. 4A-6C and 10A-10B.

In FIGS. 12A and 12B, the location at which the TLI is recorded on the disc will be within a specific management area, e.g., as shown in any one of FIGS. 7 to 9. However, for description convenience, the TLI (=TLI1+TLI2) is shown in FIG. 12A to be located at the end portion of the TDMA0, for example. For description convenience, the TLI structure illustrates in FIG. 12B the case where the in-use TDMA is indicated as shown in the first embodiment (FIGS. 4A to 4E).

Although the TLI2 (94) is used to indicate the usage status of the areas of the TDMA4 in the example of FIG. 12B, the TLI2 can be used to indicate the usage status of the areas of any TDMA that is expanded according to the expansion of the corresponding SA.

Figure 13A:
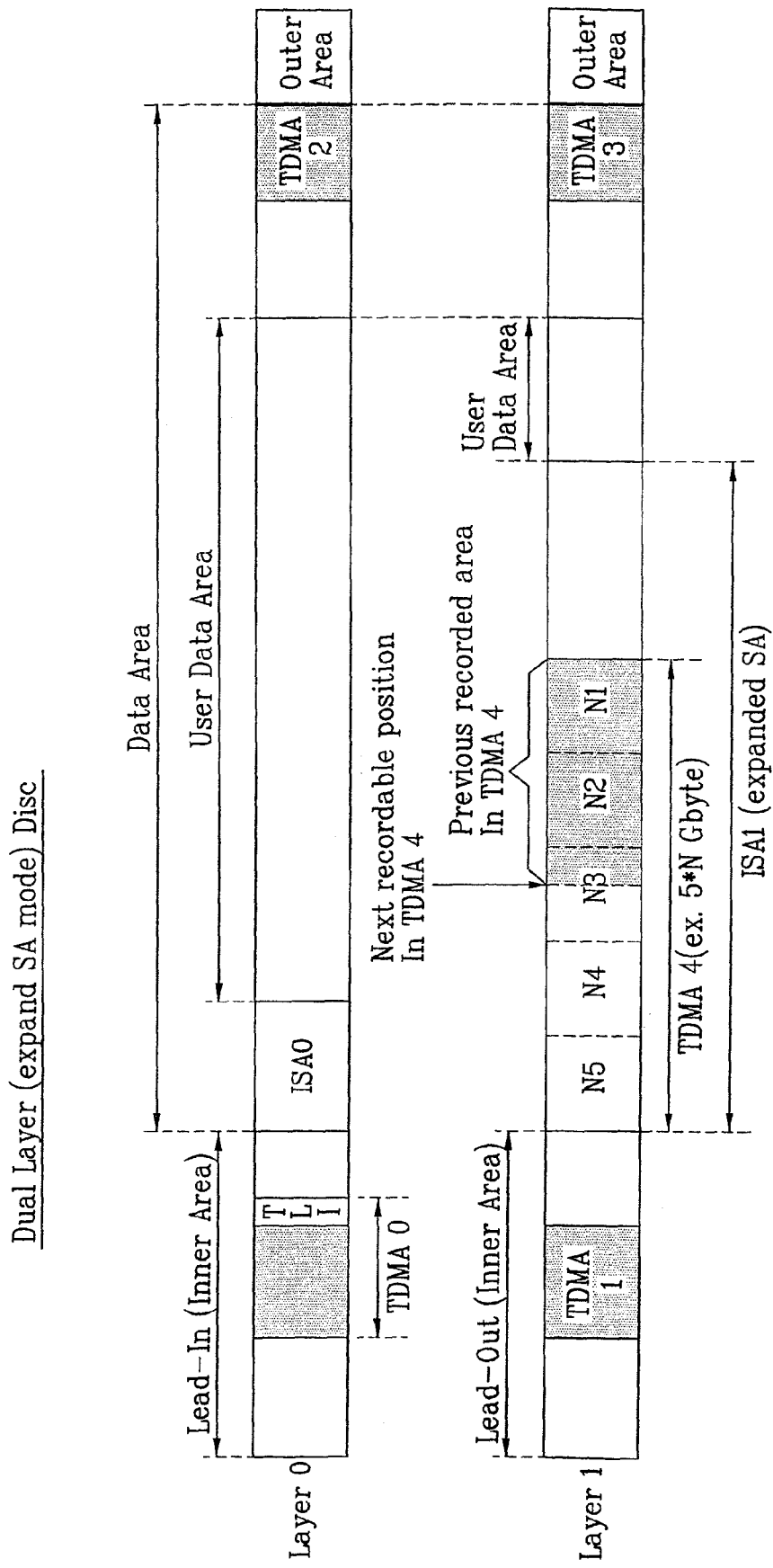
Figure 13B:
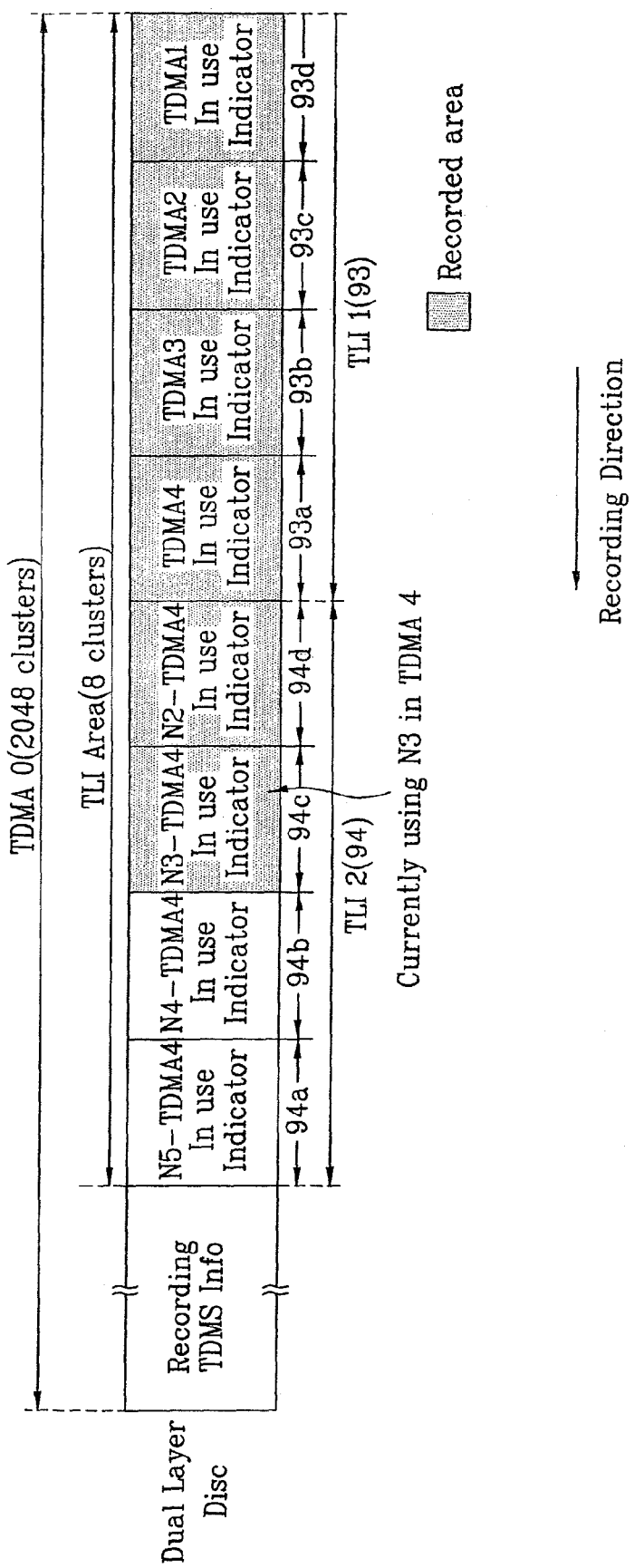

FIGS. 13A and 13B illustrate an example of how the TLI in FIGS. 12A and 12B can be used.

As shown in FIG. 13A, assume that the TDMA0, the TDMA1, the TDMA2 and the TDMA3 of the disc are currently fully used up and that it is currently in use of a specific duration/area of the last TDMA4, for example, the N3 duration.

As shown in FIG. 13B, since the TDMA0, the TDMA1, the TDMA2 and the TDMA3 are full and the last TDMA4 is currently in use (i.e., the TDMA4 is the in-use TDMA), the four clusters 93a-93d of the TLI1 (93) are recorded (e.g., with real or dummy data) to be in the recorded state. Further, since the N1 and N2 durations/areas of the TDMA4 are full, then the third and fourth clusters 94c and 94d of the TLI2 (94) are placed to be in the recorded state to indicate that the N3 of the TDMA4 is current in-use.

Figure 14:
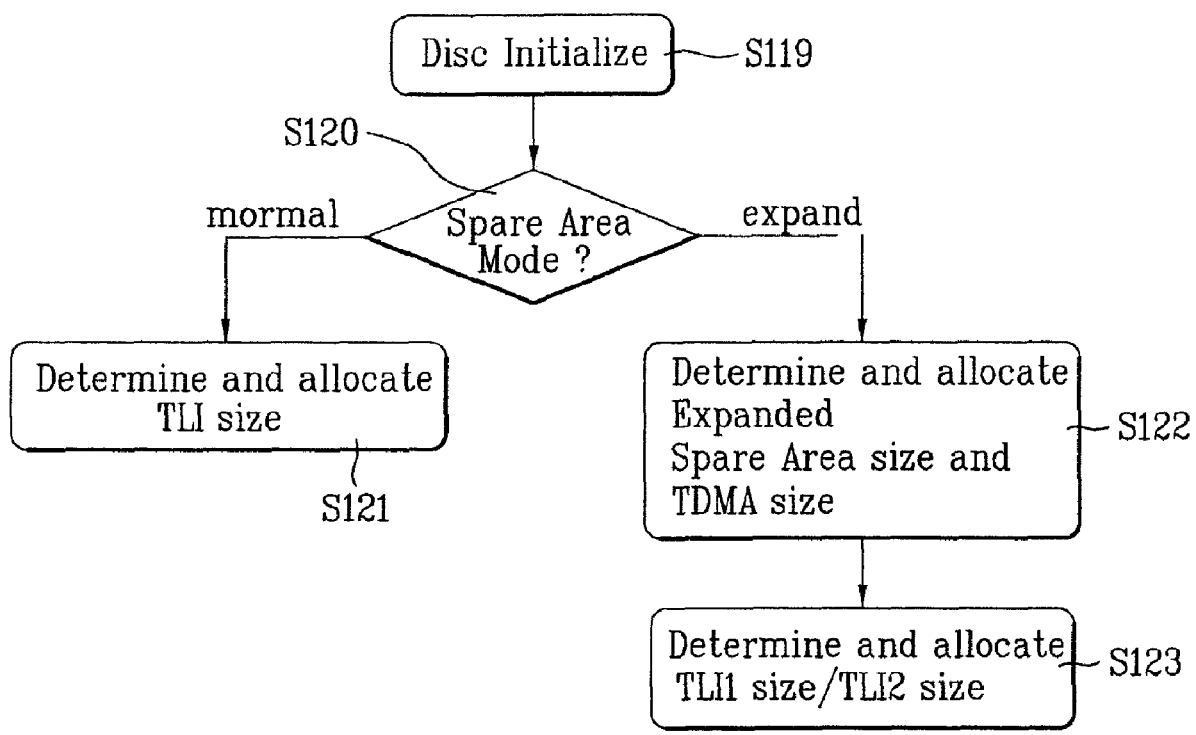
FIG. 14 is a view illustrating an initializing method according to a spare area allocation mode of the present invention.

FIG. 14 illustrates a disc initialization method according to an embodiment of the present invention. This method can be implemented in any disc structure and TLI structure discussed herein.

Referring to FIG. 14, when the disc is initialized (S119), a user or system determines the spare area mode of the disc (S120). This can be done using any existing technique, e.g., based on user input or a mode signal/data recorded on the disc. If the spare area mode is in the "normal" mode, the TLI is allocated on the disc with a size one less (x−1) than the number (x) of TDMAs allocated on the disc (FIGS. 4A-5C), or the TLI is allocated on the disc with the same number (x) as the TDMA allocation number (x) (FIGS. 6A-6C) (S121).

If the spare area mode is determined to be in the "expand" mode at step S120, the size of the TDMA existing within the expanded spare area is expanded and the expanded spare area is divided into a specific number (y) of the same-sized durations/areas. The TLI2 is allocated on the disc with the size one less (y−1) than the divided specific number (y) (S122). In this case, similarly, the TLI 1 is allocated on the disc with the size one less (x−1) than the total number (x) of TDMAs allocated on the disc (S122). In this regard, steps S122 and S123 can be implemented according to the TLI structure discussed in connection with FIGS. 11A-13B.

The method of FIG. 14 and any other method discussed herein according to the embodiments of the present invention can be implemented in any disc/TLI structure discussed herein.

Figure 15:
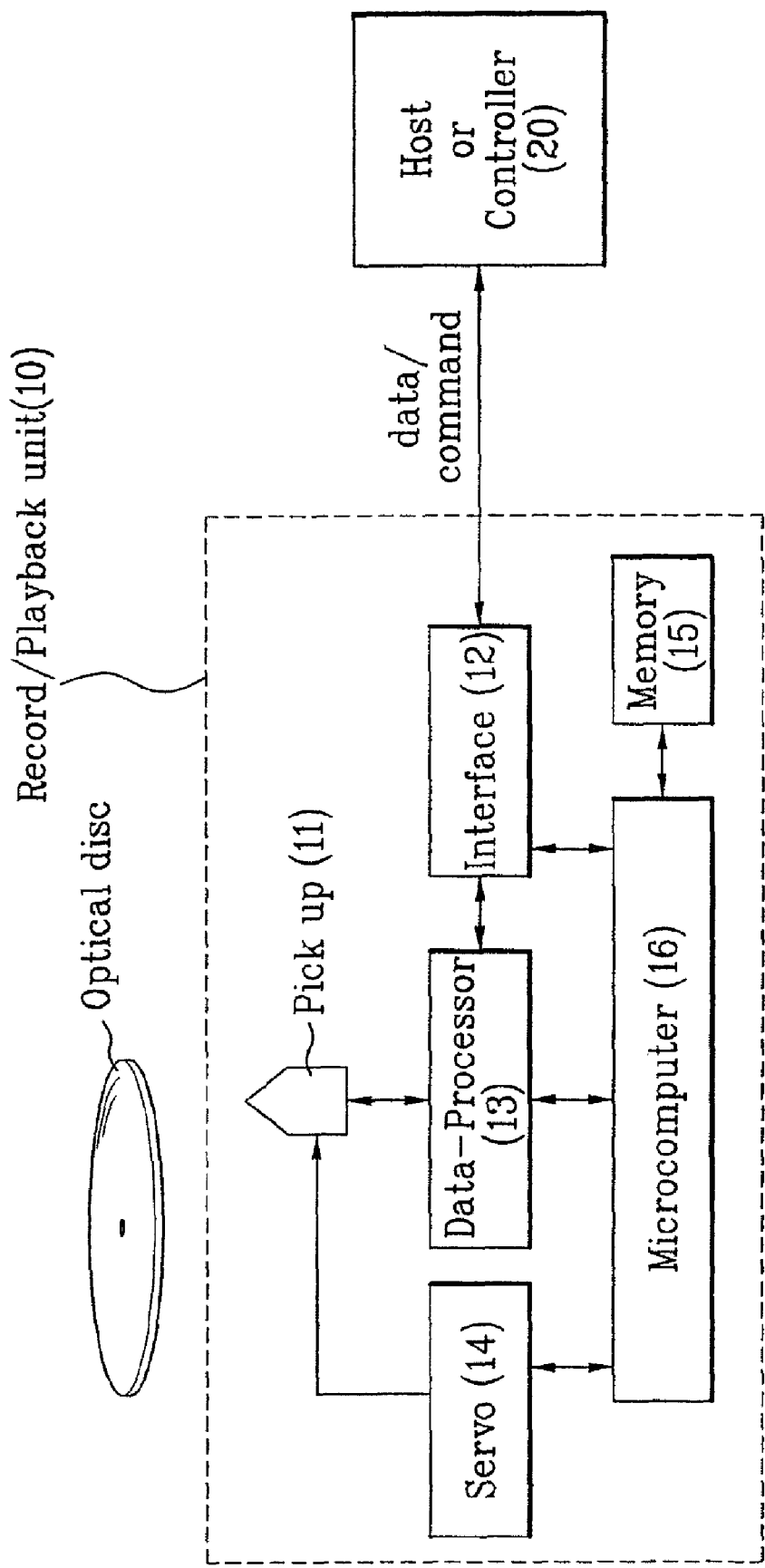
FIG. 15 is a view illustrating a reproducing/recording apparatus for a write-once optical disc according to an embodiment of the present invention.

FIG. 15 illustrates a recording/reproducing apparatus according to an embodiment of the present invention. The methods of the present invention can be implemented by the apparatus of FIG. 15 or other suitable device/system. The recording/reproducing apparatus includes a recording/reproducing unit 10 for performing reproduction and/or recording from/on an optical disc, and a control unit (or host) 20 for controlling the recording/reproducing unit 10. The control unit 20 sends a record command or a reproduce command for a specific area on the disc to the reproducing unit 10. The recording/reproducing unit 10 performs the recording/reproduction in the specific area according to the command of the control unit 20. The recording/reproducing unit 10 can employ an optical drive.

The recording/reproducing unit 10 can include an interface unit 12 for performing communication with an external device such as the control unit 20; a pickup unit 11 for directly recording or reproducing data to/from the optical disc; a data processor 13 for receiving the reproduction signal from the pickup unit 11 to convert the receive signal into appropriate signal values, or for modulating a to-be-recorded signal into an appropriate recording signal for the optical disc; a servo unit 14 for controlling the pickup unit 11 to precisely read the signals from the optical disc, or to precisely record the signals on the optical disc; a memory 15 for temporarily storing a variety of information including the management information and data; and a microprocessor 16 for controlling the operations and structural elements within the unit 10.

An example of a description of a disc reproduction method using the inventive TLI in the apparatus of FIG. 15 is as follows.

If a disc is loaded, the recording/reproducing unit 10 obtains a variety of recorded disc information from the loaded disc. Specifically, if the loaded disc is a write-once optical disc, for example, a BD-WO as discussed herein, the microprocessor 16 checks the recorded/unrecorded state of the TLI cluster(s) at a designated location (e.g., from the head portion of the TDMA0) within the management area to obtain the last recorded location within the in-use-TDMA.

Accordingly, after the location of the in-use-TDMA is obtained by accessing the TLI, the in-use-TDMA is scanned from the beginning to obtain the last recorded TDMS information, or the TDDS information may be obtained from the TLI. A portion of the obtained TDMS information is transmitted to the control unit 20, and the control unit 20 uses the transmitted TDMS information to transmit again the reproduction command to the recording/reproducing unit 10, thereby performing the reproduction using the recording/reproducing unit 10.

An example of the method of recording the inventive TLI using the apparatus of FIG. 15 is described as follows.

The microprocessor 16 records the TDMS information in the plurality of TDMAs, which are determined and used in a specific use sequence. For example, first the TDMA0 begins to be used. If the TDMA0 is fully used up, a specific TLI cluster is recorded to be in the recorded state as discussed above, whereby the TDMA1 is indicated as the in-use TDMA.

When the disc is in an idle state or in a disc eject state after the disc recording is all finished, the location of the in-use-TDMA is checked such that the above operation can change the specific cluster within the corresponding TLI to be in a batch recording state.

As described above, the present invention has an advantage in that in the write-once optical disc, the access time to obtain the location of the in-use-TDMA is reduced significantly, thereby greatly enhancing the use efficiency of the write-once optical disc using the TDMAs. Further, other information such as the latest TDDS information can be recorded in the TLI, which can be accessed and used as needed, especially if the TDDS information stored in the TDMAs is damaged.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A system for recording management information on a recording medium, the recording medium including at least one temporary management area for storing management information before the recording medium is finalized, the at least one temporary management areas being used in a designated order, the system comprising:
   a recording device adapted to record data on the recording medium, the recording device including:
      a pickup unit adapted to record management information in each of the at least one temporary management areas, and to create at least one access indicator indicating which of the at least one temporary management areas is currently available for use, and
a microcomputer coupled to the pickup unit and configured to control the pickup unit to create an access indicator in one of the at least one temporary management areas when temporary management areas become available; and
a host device, operatively coupled to the recording device via an interface, configured to transmit to the recording device a write command for recording data onto the recording medium.

2. The system of claim 1, wherein the microcomputer is configured to control the pickup unit to create the at least one access indicator in a lead-in area of the recording medium.

3. The system of claim 1, wherein the microcomputer is configured to control the pickup unit to create the at least one access indicator in a head side of the one temporary management area.

4. The system of claim 1, wherein each of the at least one access indicators corresponds to a respective one of the at least one temporary management areas except a first used temporary management area.

5. The system of claim 1, wherein the microcomputer is configured to control the pickup unit to record data on the access indicator when temporary management areas become available.

6. The system of claim 1, wherein each of the at least one access indicators comprises one cluster.

7. A system for reproducing management information from a recording medium, the recording medium including at least one temporary management area for storing management information before the recording medium is finalized, the at least one temporary management areas being used in a designated order, the system comprising:
a reproducing device adapted to reproduce data from the recording medium, the reproducing device including:
a pickup unit adapted to directly read data from the recording medium, and
a microcomputer configured to determine which of the least one temporary management areas is currently available for use based on at least one access indicator located in one of the at least one temporary management areas, the microcomputer coupled to the pickup unit and configured to control the pickup unit to read the management information from the determined temporary management area and to control the pickup unit to reproduce data from the recording medium based on the read management information; and
a host device, operatively coupled to the reproducing device via an interface, configured to transmit to the reproducing device a reproducing command for reproducing data from the recording medium.

8. The system of claim 7, wherein the at least one access indicator is located in a head portion of the one temporary management area.

9. The system of claim 7, wherein the microcomputer is configured to determine which temporary management area is currently available for use by checking whether or not each of the at least one access indicators has recorded data.

10. The system of claim 7, wherein each of the at least one access indicators comprises one cluster.

11. A system for recording management information on a recording medium, the recording medium including a plurality of temporary management areas for storing management information before the recording medium is finalized, the at least one temporary management areas being used in a designated order, the system comprising a recording device including:
a pickup unit adapted to directly record data on the recording medium; and
a microcomputer coupled to the pickup unit and configured to control the pickup unit to record data onto an access indicator located in one of the at least one temporary management areas when temporary management areas becomes available so as to indicate which of the at least one temporary management areas is currently available for use.

12. The system of claim 11, wherein the one temporary management area includes one or more access indicators corresponding respectively to each of the at least one temporary management areas, except a first used temporary management area, so as to indicate which of the temporary management areas is currently available for use.

13. The system of claim 12, wherein the microcomputer is configured to create the one temporary management area is located in a lead-in area of the recording medium.

14. The system of claim 12, wherein the microcomputer is configured to control the pickup unit to create the one or more access indicators at a head side of the one temporary management area.

15. The system of claim 12, wherein the one temporary management area is the first temporary management area.

16. The system of claim 12, wherein each of the one or more access indicators comprises one cluster.

17. The system of claim 12, wherein the recording device comprises:
a data processor configured to modulate a signal into an appropriate recording signal;
a servo configured to control the pickup to record the recording signal on the recording medium; and
a memory configured to temporarily store management information of the recording medium,
wherein the microcomputer is further configured to control operations of the data processor, the servo and the memory.

18. The system of claim 17, further comprising:
a host device, operatively coupled to the recording device via an interface, configured to transmit to the recording device a write command for recording data onto the recording medium.

19. A system for recording management information on a recording medium, the recording medium including a plurality of temporary management areas for storing management information before the recording medium is finalized, the plurality of temporary management areas being used in a designated order, the system comprising a recording device including:
a pickup unit adapted to directly record data on the recording medium; and
a microcomputer coupled to the pickup unit and configured to control the pickup unit, wherein the microcomputer is further configured to
determine which temporary management area is currently available for use based on one or more access indicators located in one of the plurality of temporary management areas,
control the pickup unit to read management information from a temporary management area determined currently available for use, and
control the pickup unit to reproduce data from the recording medium based on the read management information.

20. The system of claim 19, wherein each of the one or more access indicators corresponds to a respective one of the plurality of temporary management areas except for a first used temporary management area.

21. The system of claim 19, wherein the one or more access indicators are located in a head portion of the one temporary management area.

22. The system of claim 19, wherein the microcomputer is configured to determine which of the plurality of temporary management areas is currently available for use by checking whether or not each of the one or more access indicators has recorded data.

23. The system of claim 19, wherein each of the one or more access indicators comprises one cluster.

24. The system of claim 19, wherein the reproducing device comprises:

- a data processor configured to convert a reproduction signal received from the pickup unit into an appropriate signal value;
- a servo configured to control the pickup to precisely read the reproduction signal from the recording medium; and
- a memory configured to temporarily store management information of the recording medium, wherein the microcomputer is configured to control operations of the data processor, the servo and the memory.

25. The system of claim 24, further comprising:

- a host device, operatively coupled to the reproducing device via an interface, configured to transmit to the reproducing device a reproducing command for reproducing data from the recording medium.

* * * * *